US00RE42149E

(19) United States
(12) Reissued Patent
Courtney et al.

(10) Patent Number: US RE42,149 E
(45) Date of Reissued Patent: Feb. 15, 2011

(54) WATER SAFETY AND SURVIVAL SYSTEM

(75) Inventors: William L. Courtney, Ft. Lauderdale, FL (US); Robert M. Carmichael, Ft. Lauderdale, FL (US)

(73) Assignee: Trebor Industries, Inc., Fort Lauderdale, FL (US)

(21) Appl. No.: 10/978,309

(22) Filed: Oct. 29, 2004

Related U.S. Patent Documents

Reissue of:
(64) Patent No.: 6,530,725
Issued: Mar. 11, 2003
Appl. No.: 09/225,892
Filed: Jan. 4, 1999

U.S. Applications:

(62) Division of application No. 08/645,206, filed on May 13, 1996, now Pat. No. 5,855,454, which is a continuation-in-part of application No. 08/149,137, filed on Nov. 8, 1993, now Pat. No. 5,516,233, which is a continuation of application No. 07/870,244, filed on Apr. 17, 1992, now abandoned.

(51) Int. Cl.
*B63C 11/02* (2006.01)

(52) U.S. Cl. ..... 405/186; 441/114
(58) Field of Classification Search ..... 405/185, 405/186; 441/108, 114, 129
See application file for complete search history.

(56) References Cited

U.S. PATENT DOCUMENTS

| | | | | | |
|---|---|---|---|---|---|
| 2,968,159 | A | | 1/1961 | Edmund | 405/186 |
| 3,269,129 | A | | 8/1966 | Zambrano | 405/186 |
| 3,808,824 | A | * | 5/1974 | Johnston et al. | 405/186 |
| 4,440,525 | A | * | 4/1984 | Perla | 405/186 |
| 4,455,718 | A | | 6/1984 | Finnern | 114/315 |
| 5,074,714 | A | | 12/1991 | Franco | 405/186 |
| 5,076,575 | A | | 12/1991 | Eylander | 405/186 |
| 5,199,820 | A | * | 4/1993 | Nicklo | 405/186 |
| 5,516,233 | A | | 5/1996 | Courtney | |
| 5,957,079 | A | * | 9/1999 | Wessels | 114/315 |

OTHER PUBLICATIONS

John L.Zumrick, NSS Cavern Diving Manual, 1988, pp. 42–43, Published by The Cave Diving Section of The National Speleogical Society, Inc.
1974 AMF Swimaster Professional Diving Equipment, Catalog No. 2740, p. 9.
Jim Walker, Sea Quest Quickdraw BC, Skin Diver Magazine, Apr. 1991.
Pages of Sea Quest 1990 Catalog for Quickdraw Buoyancy Compressor.
1990 Dealer Price List, Dive Rite Manufacturing, Inc., Part # 2050.
1992 Dive Rite Manufacturing, Inc. Catalog, p. 11.

* cited by examiner

*Primary Examiner*—Tara Mayo-Pinnock
(74) *Attorney, Agent, or Firm*—Daniel S. Polley, P.A.

(57) ABSTRACT

A counterweight assembly is provided to enhance heads up surface positioning of a person. The assembly includes a weight/ballast member strategically disposed on a cylinder/tank worn by a diver during a dive. The weight member can be attached by several different embodiments. Preferably, the weight member is attached such that the diver cannot release or adjust the weight member while he or she is diving. The weight member rotates the person to ensure heads up surface positioning in the event the person becomes incapacitated. Also provided are several other water safety and survival devices.

12 Claims, 20 Drawing Sheets

DIVER IN BALANCE 301
302
320
322
330
306
320
304
320
328
324

360
302
314
306
340
316
304

363
302
354
348
340
346
360

342
344
354
350
352
340

400
420
430
432
301

440
434
420
430

500
502

400
420
432
435
437
430

400
441
440
432
432
430

420
500
500

FACTORS CONTRIBUTING BALLAST AND BUOYANCY TO DISTRESSED DIVER.

DIVER IN BALANCE

VARIABLE WEIGHT SIZING W/HOOK FASTENER

WATER SAFETY AND SURVIVAL SYSTEM

Matter enclosed in heavy brackets [ ] appears in the original patent but forms no part of this reissue specification; matter printed in italics indicates the additions made by reissue.

This Application is a divisional of U.S. patent application Ser. No. 08/645,206, filed May 13, 1996, now U.S. Pat No. 5,855,454 which is a continuation-in-part of U.S. patent application Ser. No. 08/149,137, filed Nov. 8, 1993, now U.S. Pat. No. 5,516,233, which is a continuation of U.S. patent application Ser. No. 07/870,244, filed Apr. 17, 1992, now abandoned.

BACKGROUND OF THE INVENTION

1. Field of the Invention

The present invention relates to water safety gear including life vests, integrated rescue products, and hypothermic protective gear, adapted for one-time use by the victim placed in the water by accident or for regular use by the water enthusiast whether a sailor or scuba diver.

2. Description of the Prior Art

Heretofore, accidental immersion often resulted in death by two causes, aspiration leading to asphyxiation or hypothermia. A life saving system, to be viable for more than a few minutes, must successfully address both of these issues. Current life vests supply the requisite amount of buoyancy to return the victim to the surface, but often require a conscious victim's involvement to keep the airway clear. While it is common practice, as well as legally mandated, that all civilian, commercial, and non-civilian vessels carry Coast Guard approved life vests, many current water safety products provide only a limited portion of the safety they are capable of providing. They do provide for positive buoyancy during the shock of the initial entry into the water, but by incorporation of the concepts disclosed herein are capable of providing significantly improved airway protection after the initial insult with significantly increased reliability of airway protection and less bulk, cost and, consequently, more compliance.

By force of habit, life vests are currently designed after clothing and as such they open in the middle of the chest, producing a point of reduced buoyancy where it is least acceptable. The division of the forward chamber into two halves produces two side chambers which are each capable of generating righting moments in the water. When a righting moment is created on the body of an exhausted or unconscious individual, they can be stabilized in a face down or side down position. If the left or right side is out of the water, concurrent loss of muscle tone in the neck allows the face, nose, and mouth to be positioned underwater. Thus, current constructions of many life vest are really only adequate for conscious, alert, and active victims because they require participation, constant monitoring and adjustment by the user to keep the face and airway out of the water.

On sudden entry into the water, water on face actuates the Dive Reflex, which is a rapid uncontrollable inhalation. This reflex often results in aspirating water with its consequent choking and coughing. This distress further complicates the victim's ability to right themselves and assist in their own rescue. It is often the case that the sailor who is knocked overboard by the boom of the sail or is swept overboard by a wave, can suffer a temporary loss of consciousness. During this initial interval it is important that their life vest not only buoy them to the surface, but that it also obtain and maintain the victim's face and airway out of the water until consciousness is regained.

The only life vest that is of any value is the life vest that is worn. Compliance can not be ignored as an important criteria in the design and manufacture of any safety product. The actual use of safety vests has begun to move forward by the hybrid personal flotation devices. The HPFD is a combination of a certain amount of inherently buoyant material along with an additional amount of inflatable buoyancy. Because of the reduced amount of bulk and therefore increased convenience associated with the hpfd, their acceptance is growing. U.S. Pat. No. 4,681,552 issued Jul. 21, 1987 to William Courtney, addresses the value of hybrid personal flotation devices. Like many vest style safety products and in particular all buoyancy compensators, the BC vest described in U.S. Pat. No. 4,681,552, when both chambers are inflated in the configuration disclosed in FIG. 1, would stabilize the user on their side, placing their airway underwater if the user was unable to hold their head up.

The vest that is constructed entirely from inflatable chambers is much more comfortable, convenient and therefore is frequently worn by itself and is now approved by the United States Coast Guard. The purely inflatable product such as the inflatable sailing harness, wind breaker, safety device, because of its compactness, is often the actual product worn by the victim. Many purely inflatable safety products attempt to compensate for the lack of inherent buoyancy by generating large amounts of lift. The use of excessive lift often results in the use of air under the arms where it creates the side up righting moment that can jeopardize the airway, a design defect addressed by the instant invention.

The airlines, because of their insoluble stowage problems are allowed the use of a purely inflatable device that has redundant chambers to guard against the failure problems inherent in single chamber safety devices. The scuba diver also wears a purely inflatable device known as a buoyancy compensator or "BC," which looks like a traditional life vest but because it lacks at least reliability is not called such. The sailor is known to use inflatable wind breakers. All these devices, as well as many not described here, that are meant to provide surface flotation to individuals in the water, would be markedly improved by incorporation of the concepts described herein. Whether constructed solely from inherently buoyant means as are traditional life vests, or constructed from a hybrid composition of inherently buoyant and partially inflatable, or constructed from purely inflatable components, the specific location of a minimal amount of ballast in accordance with the construction herein disclosed would confer dramatic improvements in bulk, cost and compliance and consequently, in safety and survival statistics at sea.

The prior art on the use of dual chambered safety vests includes Swedish patent #203592 issued to Lindqvist on April 1966. This patent discloses a dual chambered product with a large forward chamber which would allow the victim to be stabilized in either a heads up position or if unconscious the victim could be stabilized lying over the forward float with their nose and mouth underwater. The device also relies on the victim's legs to apply tension to a draw string to pull the rear chamber up behind the victim's neck. For the active participant the product may have some utility but would be unsuccessful if not closely regulated. In addition the product is needlessly large and thus unnecessarily bulky when deflated, a feature that often results in the product being stored in a locker rather than being worn.

The buoyancy compensator is a convenience product that has unfortunately replaced the diver's safety vest. The buoyancy compensator is a specific adaptation of a purely inflatable safety product that is worn by the diver for use both at the surface and underwater. The product evolved from the orally inflated safety vest that had the appearance of and was often called a horse collar vest. After decades of diving it was decided that the diver would benefit from the inclusion of a chamber to hold air while under water to offset the loss of buoyancy that occurs as the diver's thermal protective gear is compressed at depth. The initial compensators for this shift in buoyancy were containers that could be filled with air to displace water and therefore generate increased buoyancy as the diver's wet suit was compressed by the water. In an emergency this device could be easily disconnected from the diver.

The next step in the evolution of the buoyancy compensator was to use the air cylinder to inflate the safety vest, a product designed to protect the airway at the surface. Its proximity to the face and neck, its obstruction of the chest and therefore the site of controls for the dry suit diver, its general bulk and appearance left room for the advent of the life vest style buoyancy compensator. The initial detached, canister buoyancy compensators were of low volume and easy to ditch. The horse collar and then the life vest style buoyancy compensator became voluminous. The larger lift capacity became equivalent to the better the product. Buoyancy compensators are available with 80 lb. lift capacities. At the surface the high lift product conferred a sense of security because it would buoy the diver far above the water as long as diver remained in firm control of the product. As the diving population became more diverse in health and age, the false sense of security led to marked competitiveness over the amount of lift that could be attached to the diver. The product is so confused with security that a diver can not get onto a dive boat without wearing a high lift buoyancy compensator for "safety" reasons.

The inflatable products worn by scuba divers as disclosed in Greenwood's U.S. Pat. No. 3,436,777; Robert's U.S. Pat. No. 3,747,140; Walters' U.S. Pat. No. 4,016,616; Wright III's U.S. Pat. No. 4,137,585; Scott's U.S. Pat. No. 4,176,418; Maness's U.S. Pat. No. 4,324,234; or Courtney's U.S. Pat. No. 4,645,465 and 4,681,552, and all buoyancy compensators in the prior art are complicated by the attachment of an air cylinder that undergoes shifts in buoyancy throughout each dive as the cylinder empties and becomes more buoyant. The size of the shift in buoyancy is directly proportional to the size of the cylinder used. The nature of the shift in buoyancy, whether the cylinder ends up positively buoyant or only less negative, is a combination of cylinder composition, most commonly aluminum or steel and the water density, fresh, brackish or salt. Some air cylinders become six pounds positively buoyant when empty in sea water. This cylinder will float on its longitudinal axis as will the diver who is attached to that cylinder. Consequently, if for any reason the diver is unconscious, such as from a minor embolism from rapid ascent, blackout, trauma, medical problem or just over exhausted after being stranded at sea, they will eventually lie along side the air cylinder with their airway under the water and statistically the deaths are recorded as drowning. The current management of the life threatening side righting moments of every vest style buoyancy compensator is to disclaim liability for keeping the airway out of the water.

The instant invention discloses the integration of a very small amount of non-releasable weight exactly opposite the diver that converts the only inflatable worn by divers into a product that will protect the airway if the diver is unable to. The attachment of weight to the air cylinder in the prior art has been a way for carrying the ballast necessary for the diver to be able to submerge, and thus were designed to carry significant amounts of weight. Patents issued have turned on the design of the release system. The dive community demands that the attachment of significant amounts of weight must be able to be quickly released by one hand, by either hand. The release mechanism must be sure in that it must not accidentally release, but once the diver chooses to release the ballast the mechanism must be simple enough that it will not fail. All of the prior art by way of its incorporation of reliable release mechanism assures the diver that as an emergency is evolving and their weights are dropped to gain a better surface attitude, the air cylinder that was critical for use under water and is now empty will be attempting to float the diver on their side. If the diver is unable to oppose this action, their nose and mouth will be forcefully submerged.

It is to be noted that in U.S. Pat. No. 4,455,718, the quick release means is positioned centrally to allow access by either hand in the event of an emergency release. Prior to the release, the central positioning of the quick release mechanism necessitates that the weights as demonstrated in FIGS. 1 and 2 and be placed off center, potentially reenforcing the side righting moments of the life vest style buoyancy compensator. The keel retaining system disclosed is built into the buoyancy compensator so it will not be lost or left at home, the buoyancy compensator cannot be safely used without this critical component. In patent U.S. Pat. No. 3,670,509 it is noted that the ballast is located in front of the tank, close to the back of the diver and consequently closer to the axis of rotation which parallels the spine of the diver, thereby drastically reducing the rotational energy generated per unit of keel weight. This greatly reduces the effective strength of the angular rotation generated by a particular amount of ballast. Since some divers in the tropics may dive with only a few pounds of weight it is important that the keel weight be kept as far away from the axis of rotation as is possible to maximize the strength of the righting moment. The critical location is on the exact opposite side of the tank from the diver. U.S. Pat. No. 3,670,509 refers to "substantial reducing" the tendency to force the diver face into the water. Use of the disclosed improvements will not allow the face to remain underwater. The ballast in patent U.S. Pat. No. 3,670,509 that attempts to reduce the face down righting moment positions the diver so that they are able to ". . . activate the weight release mechanism.", with the loss of the ballast the diver then would be back to floating on their side with their airway underwater. U.S. Pat. No. 3,967,459 locates the weight system inferior and adjacent to the diver nearly the exact opposite as disclosed herein. It is also noted that this weight system is intended to be released in an emergency reestablishing the tendency of the cylinder to submerge the diver's airway. The integrated ballast system of U.S. Pat. No. 4,752,263 is similar in that it is releasible, and located inferior and adjacent to the diver allowing for an airway endangering surface position. The ballast system disclosed in U.S. Pat. No. 2,120,420 places weight symmetrically about the diver which would totally eliminate any heads up fighting moment and in fact would stabilize the diver 50% of the time in a face down position, additionally, this system is not designed to be used with an air cylinder, but rather a surface supply air system.

The instant invention achieves many critical features including providing that the weight be permanently attached, so that in an emergency it cannot be dropped. Since the keel weight must be small enough to not compromise surface safety, it must be located on the cylinder exactly opposite the diver where it generates the maximal rotational energy per pound of keel, rotational energy desperately needed to repeatedly turn the unconscious diver over onto their back against minor righting moments caused by limbs, variations in body density, and attached gear. In particular, if the victim dives near heavy surf where the waves can flip a victim over onto their face, a strong heads up righting moment is essential.

Another critical problem with the use of all current buoyancy compensators is that they combine high lift surface flotation needs with low lift underwater buoyancy needs. That same device at depth entraps pressurized air by design. The 190 lb. diver at 120 feet underwater requires nine pounds of air in their buoyancy compensator due to compression of their cold water wet suit, should that diver begin an uncontrolled ascent because; their regulator malfunctions, their tank is empty, they lose their mask and become disoriented, the power inflator sticks on their buoyancy compensators, they suffer a minor medical problems as they attempt an emergency assent, for whatever the reason, as the diver ascends, the air in their buoyancy compensator begins to expand. Ten pounds of air at 99 feet underwater, increases to 13.3 pounds at 66 feet and increases to twenty pounds at 33 feet and doubles forty pounds during the last 33 feet of the water column, enough air to create excessively fast ascent rates.

Recommended safe ascent rates are in the process of being reduced from 60 feet per minute to 20–30 feet per minute. A buoyancy compensator that can contain 30 lbs. of air can accelerate a diver who is stationary less than 10 feet underwater to the surface at average velocities over the last 4 feet, in excess of 200 to 250 feet per minute. Ascent rates from greater depths or ascent rates with larger buoyancy compensators such as currently available products generating 40, 60 or 80 lbs. of lift are unknown. It is known that if a person's lungs are fully inflated and they hold their breath while ascending three and a half (3½) or four (4) feet, their lungs will rupture. Pulmonary barotrauma introduces air into the circulation where it can obstruct circulation and result in infarction of the tissue involved. Since the diver is often vertical during an uncontrolled rapid ascent, the embolism most often travels to the brain. Unless the diver is re-compressed within minutes damage is permanent and possibly fatal. The prior an on buoyancy compensators, as is practiced in the diving community, unfortunately combines low lift buoyancy compensation needs with high lift surface flotation. The prior an buoyancy compensator is in desperate need of the many advances disclosed herein.

Once the conscious or unconscious individual is supported safely at the surface with their airway free and clear, the next major threat to the water borne victim whether recently returned from the depths or a survivor of a common carrier accident such as an airplane crash, is from; not being seen by search and rescue efforts, of being drowned while attempting a rescue or from hypothermia.

The rapid lowering of the body's core temperature results in interruption of life sustaining cognitive activities such as staying in a tucked fetal position, which further aggravates heat loss. With the loss of cognition the victim stops monitoring and responding to changing surface conditions. Inevitably hypothermia interferes in brain stem activities such as musculoskeletal tone and respiration. It is widely known that hypothermia is the actual killer in most accidental immersions. In response to such knowledge, exposure suits have been developed to insulate individuals and preserve core temperature thus extending survival from minutes to hours. An effective exposure suit is a large, bulky item that is prohibitively expensive. Despite these serious drawbacks it is the only alternative to dying from hypothermia within minutes and as such it is a legally mandated safety device for the industrial sector where its costs, bulk and inconveniences can be borne. Exposure suit costs and bulk have prevented their use being required in the recreational, civilian or commercial carrier sectors such as airlines, liners, ferries etc. Therefore it is clear that despite recognition that hypothermia is the active process in death at sea, there has not existed until this time a viable, affordable, storable means to control hypothermia.

To address this deficiency in the prior art, the current invention addresses both aspects of safety at sea. Rescue can rarely be performed within minutes. Often the sailor on watch is not missed until the next watch, obviously the single handed sailor is never missed. The sinking of a civilian or commercial carrier is often unattended for many hours or longer. As is noted in Harrigan's U.S. Pat. No. 2,114,301; Bennett's U.S. Pat. No. 3,105,981; or DeSimone's U.S. Pat. No. 4,187,570, there exists complex, bulky and costly means whereby jet pilots and navy personnel have personal power inflated life rafts. These automatically inflated life rafts require a cylinder whose cost alone is prohibitive to private and commercial carriers. The bulk of the cylinder, the bulk of the raft constructed from a fabric capable of withstanding pressurized inflation and high impact forces results in a device that is incompatible with civilian and commercial carriers such as airlines or ferries, yet alone individuals wind surfing, fishing from rubber rafts or touring ocean kayaks.

SUMMARY OF THE INVENTION

The smallest safety vest that reliably protects the victim's airway is ideal because of its lower cost, reduced bulk when deflated, and improved appearance, all factors that contribute to compliance with use, the true basis of success in any emergency. The current water safety vest distinguishes the two critical points of buoyancy, one behind the neck and head with the second point of buoyancy being in the area of the umbilicus, and one of ballast, behind the victim and their flotation chamber. A very small amount of buoyancy and ballast securely attached to the victim at these two points is sufficient to roll an individual over and put them on their back, thereby protecting their airway from submersion. Entry and adjustments are from below, from the side or if from the front then the front chamber must overlap and be maintained and secured in a central position. Only this combination of small buoyant chambers reliably creates safe positioning of the victim's neck and head. This face up righting moment is generated regardless of the angle of entry into the water or level of conscious participation. This strong righting moment also compensates for the ongoing effects of rotational forces such as waves that at a certain point will overcome the lateral stabilization provided by the rear perimeter chamber.

Ideally the rear chamber is constructed to cradle the head and neck preventing it from drooping over backwards or sideways and becoming submerged. The chamber can be extended along the sides where they act much as outriggers, stabilizing the body from being rolled over because of wave action. The perimeter rear buoyant chamber defines a space, and actually forms a containment means for stowing a separating flotation chamber, such as a multi-function rescue safety product. It also is the ideal site of expansion that occurs when an inflatable life vest is actually inflated. All inflatable buoyant chambers upon inflation convert from a two dimensional product to a space occupying three dimensional object. This creates a shortening that results in constriction. Power inflated vests generally have an over pressure valve to protect against rupture but before this is actuated an unacceptable amount of pressure is applied to the thorax of the wearer. To compensate for this either the garment is very loose so that when it is inflated the wearer can still breathe or the chamber slides along a retaining strap or belt shifting the position of the inflatable bladder and thereby shifting the righting moment. Current inflatable vests upon inflation slide to the rear as an accommodation to the front entry. This pulls the buoyant means towards the back and results in greater moments of stability in the side high position winch submerges the airway. In the current embodiment if the vest is entered from the front its closure is fixed. The rear buoyant chamber upon inflation stretches away from the center of the back and out towards the sides strengthening the lateral stability of the vest and the forward central buoyant bubble remains aligned along the center.

There are several reasons that most life jackets are vest style; the historical basis of clothing design, the need to locate the required amount of lift required by the regulatory agencies and the degree of fit. The buoyancy generated by the life vest must be able to be secured reliably about the torso of the wearer. Entry into the water or rough surface action must not strip the life jacket from the victim, in this regard the secure closure, appropriate sizing and an elastic component combine to provide a reasonable attachment. The only way to be assured that the victim and their life jacket will not be separated is by the inclusion of a crotch strap. Once again compliance is a function of comfort. If the crotch strap is loosely attached prior to entry into the water then easily adjustable while in the water, it might be used. A wet, limp, unconscious victim being tossed about by waves will require a retaining strap between the legs to optimize the survival value of any buoyant product attached to the victim. Its inclusion in a life saving system is necessary, the option of its timely use is a function of comfort and cosmetics. Another reason for the current vest design of water safety products is that the Coast Guard use to require certain amounts of buoyant lift for varying classes. Commercial requirements exceed those for personal use, but all classes displace such a large volume of water that the buoyant means needs to be spread out over a large surface area such as is provided by a vest style life jacket configuration, despite its serious drawbacks.

Some vest style life jackets have four righting moments; face up, back up, left side up and right side up. The current invention creates a broad base triangle. Central to this invention's uniqueness is a small buoyant bubble that is centrally located in front of the wearer, and a small amount of ballast posterior. The front chamber is responsible for initiating the righting moment and the counterweight eliminates the side position, and supplies the rotational energy needed to roll the victim over onto their back thereby assuring that the victim's face will be out of the water regardless of the angle of entry. Once the forward chamber has reached the surface, it in conjunction with the dynamics of a limp unconscious body, will oppose any tendency for the waves to roll the victim over into a face down position that would compromise the airway. If the front chamber is too wide, it can combine with the rear buoyant bladder and create a second, life threatening righting moment in which either side could be held at the surface and concomitantly the airway submerged. In summary, the rear buoyant chamber provides a base of support for the head and neck, supporting the airway and providing lateral stabilization, opposing rotational motion of the waves from over turning the victim into a face down position, but in the event that occurs, the forward buoyant bubble that is located at the umbilicus will automatically flip the victim back over onto their back, reestablishing the heads up orientation.

While the forward and rear buoyant chambers could be constructed form a single chamber, ideally two or more chambers confer several advantages. In this design one of the chambers is retained by a releasible system. This feature allows the wearer the option of being able to remove a chamber and use it as a distress marker, thus the preferred embodiment is to construct the forward chamber from a highly visible and radar reflective material. Separation also allows the chamber to be used as a rescue device. It can function as a rescue board to approach a swimmer in distress or used as a buoyant assist beneath the arms of the rescuer to provide lift in the event the rescuer is attempting to perform artificial respiration while in the water.

In adapting the product for the scuba diver, the separating chamber can be used under water by the advanced diver to mark a dive site such as in search and rescue attempts. The separating bladder can also be used as an underwater lift or salvage device rather than the common but unsafe practice of using the divers high lift buoyancy compensator as a salvage device. In the event that the object being salvaged slips from the divers grasp, the diver suddenly becomes markedly buoyant and is thrown into an uncontrolled ascent. In the event of a sudden increase in boat activity the diver could leave the separating chamber at the surface marking die dive site, so that boaters will avoid driving over the partially submerged diver. The universal retaining strap of the releasible chamber ideally has an elastic component to allow for distention of the bladder when it is inflated. The separating chamber when modified for use underwater in a buoyancy compensator must be reliably regulated. Safe and secure containment of the bladder underwater is critical. As helpful as additional buoyancy is at the surface, that same buoyancy underwater represents serious exposure to rapid ascent with its numerous serious problems. On the other hand the surface flotation chamber must also be simply and quickly deployed to be of assistance of an emergency at the surface.

Because the volume of the buoyancy compensator has been reduced to mitigate the chances of rapid ascent, it is foreseeable that the forward surface flotation chamber may not be deployed in an acute emergency underwater so the rear chamber and the disclosed keel weight have to be sufficient to protect the airway by establishing a heads up orientation with or without the deployment of the forward chamber.

When an air cylinder is attached to the heads up life vest, the life vests counterweight must increase in size to offset any additional outrigger effect. It is called a keel, because when the diver is lying face down at the surface and goes limp, the tank compensating keel weight, like the keel of the sail boat will roll the diver over onto their back, stabilizing the airway out of the water. The compensating portion of the name is because the size of the weight is in proportion to the type and size of the vest, cylinder and whether the water is fresh or salt. If the cylinder when empty is neutral to slightly negative if will sink allowing the diver to roll over onto their back. The keel weight in other words compensates for the buoyancy shifts of the diver's jacket and air cylinder. If the cylinder remains negative when empty then the keel weight can be smaller but still must generate sufficient angular momentum to offset the secondary righting moments generated by an imbalanced weight belt and attached gear or bladders. If the keel weight is used as an adaption to existing vest style buoyancy compensator, then it has to be strong enough to overcome the side righting movements generated by the common practice of using buoyancy under the arms.

Central to the tank compensating keel weight's design is that it be made of a very dense material such as lead, and be located exactly opposite the diver on the back side of the tank. Traditionally the buckle that generates pressure on the belt that attaches the buoyancy compensator to the tank is located in the center at the back of the tank. Because the posterior central position is so critical for the performance of the keel, the buckle has to be moved off center. This shift in the cam buckles location results in a slight inconvenience in terms of reduced access but is necessary to preserve the critical location and therefore the righting moment of the compensating keel weight.

Ninety (90%) percent of drowned divers are often found with their weight belts still on and fifty (50%) percent of such are at the surface. Usually the weights are located along the waist and the amount runs from a couple of pounds to more than forty pounds. As the amount of weight increases, the keel weight needs to be located higher up the air cylinder to offset the placement of the weight belt. The dual tank band allows for a wide variation of weight placement. Obviously, the keel weight could be incorporated into the metal of the cylinder, adhered to the cylinder, enclosed in a covering of any sort, or even attached with magnetism. A pouch or cylinder could be used to contain lead shot or beach sand as long as it is located along the longitudinal axis of the cylinder and thereby serves to generate the heads up righting moment.

Additionally the concept of critical ballast is such that a certain amount of ballast is absolutely required in order for the diver to stay underwater. To facilitate the concept of safe diver weighting the tank compensating keel weight is also used to offset the inherent buoyant material from which the buoyancy compensator itself is constructed. Thus, because of the tank compensating keel weight, the buoyancy compensator, the tank, and regulator combination is neutral and as such does not contribute to the consolidation of additional ballast on the weight belt. If the quick release buckle of a consolidated weight belt should snag on a plant or slip out of hand during adjustment at depth the dangers of an uncontrolled buoyant ascent are somewhat mitigated because the shift in buoyancy is reduced by the amount of ballast used as a tank compensating keel weight.

While the forward chamber is not critical for protecting the airway of the scuba diver because of the effectiveness of the tank compensating keel weight, the forward chamber's ability to provide additional high lift surface flotation fulfills an expectation in the sport. The key to the addition of high lift surface flotation to the diver underwater is its safe regulation. The operation of the forward chamber requires diametric opposed properties of the valve chosen to regulate the chamber. One embodiment employs the use of a variable fabric valve fabricated from a self releasible hook and loop fastener such as VELCRO® that can operate in three different modes, as a manual on/off valve, semi-automatic valve or a fully automatic valve. In addition, as the fabric valve ages its strength can be renewed by further increasing the interactive surface area.

The value of including a variable valve in line between the rear chamber and the forward chamber is that the diver can become more responsible with experience and training for the total amount of lift available to the diver underwater as well as at the surface and thus more responsible for uncontrolled ascent rates and consequently the risk of pulmonary barotrauma, arterial gas embolism and its frequent outcome cerebral infarction as well as the risks of decompression sickness.

Some dive instructors fear that the beginning student will not be able to perform an additional task in an emergency and therefore prefer that the entire buoyancy system automatically inflate choosing simplicity of operation at the expense of exposing the beginning diver to the consequences of a more rapid uncontrolled ascent, despite the fact that deaths have occurred during buoyant ascents while training in a swimming pool. In particular, since the student will be involved in a lot of surface drills and exercises, such as determining how much weight they require in order to be able to submerge, clearing their masks and snorkels, and since the first dives will be shallow, the consequences of rapid ascent are severe. As their experience grows and their comfort in the water with their gear and the concepts of correct weighting develop, they will be making deeper dives where the consequences of sadden ascent continue to mount and become progressively more severe. As the student begins to submerge and the lungs become more pressurized the manual operation mode of the valve is necessary for the diver to safely regulate the total amount of lift attached to their body underwater and thereby mitigate one of the major risks of diving.

As the buoyancy compensator is reduced to a device dedicated to contain the small amounts of lift actually required while underwater, some instructors are concerned that the diver will not be able to rely on the buoyancy compensator for a buoyant ascent. The problem with buoyant ascents is that they are very difficult to control when all the divers' faculties are intact In an emergency the ability to regulate a high lift buoyancy compensator at depth is very unlikely. Optionally, one of the forward chambers can be a low volume chamber designed for emergency ascent which has incorporated a rupture plug, disc or weld so that if the product is deployed unintentionally by use of a CO2 cylinder or the divers air cylinder, or accidentally, it will self destruct at a preset pressure differential, limiting its buoyant assist to the first leg of an emergency ascent allowing the diver a second chance to regain control and reduce their velocity to a safe rate. Some of the larger high lift surface flotation chambers may never fill to rupture so its containment system that regulates its inflation must be very secure to be assured that it will only be deployed intentionally, otherwise the diver would be in the same high lift rapid ascent predicament that they currently find themselves in with today's product.

Incorporated within the multi-chambered heads up safety vest is a multi-function rescue safety product which can culminate into a raft for removal of the victim from the water and thereby confer protection from hypothermia. The needs and use of this rescue safety product determines its requirements for durability which in turn determines the type of fabric, its storable volume and therefore the location of the rescue product within the safety vest. The primary flotation device or life vest stays secured to the individual to assist them during their entry, and support them while they are deploying the rescue product. Once inflated if the product is not needed for rescue or signaling, the rescue product evolves into a raft that the individual can crawl into. The life vest remains on the victim protecting the individual should they be washed overboard as well as insulating the trunk, further helping to maintain core temperature.

The need and uses of a rescue device varies with the application. For the civilian airline passenger suddenly thrust into a survival situation, they are provided with a floating cushion or a lightweight inflatable life vest. In this situation a single use, ultra lightweight product is ideal. Such a rescue product might be constructed from an all welded mylar film. A multiplicity of layers would confer separate air chambers within the product providing for insulation, conferring a puncture protection while remaining small enough to fit inside a seat cushion or within a pocket of a purely inflatable life vest. To facilitate the single use products operation the oral inflator would lead to a manifold which could be constructed of differing diameters and/or which would pass through separate one way check valves of differing relief pressures. The diameter and/or pressure relief valves would direct the flow of air such that the chambers could be inflated sequentially. As pressure in the system builds up after inflating the first air chamber the second begins to inflate. The arrangement would allow for the inflation of a life ring first, followed by the rescue float, then if necessary a large outer tube would convert the rescue product into a raft with a canopy arch. The mylar, in addition to reflecting the radiant energy back towards the victim, is mirrored so that it is highly visible and radar reflective both of which would facilitate search and rescue. It structurally would resemble a single use raincoat. With the advantages conferred by this invention the victim could be of assistance to themselves and to others. Survival would be increased from minutes to days, dehydration would become the next serious threat to the survivor. An off the shelf plastic solar still could be easily included for transoceanic passages.

The water enthusiast on the other hand may find themselves in the water more often than the civilian airline passenger and their needs may tolerate slightly more bulk from the stored rescue product in exchange for reusability. The bulk increases because of the demands of a more durable and reusable product requires a more substantial choice of fabric. As the bulk increases, the location for stowing the rescue product becomes more critical. The ideal location is built into the back of the life vest where it is out of the way but securely and accessibly stowed until needed. In this posterior and inferior position the actions of the new and improved life vest are retained, that is the perimeter of the torso is supported by the rear inflation chamber of the life vest, stabilizing the victim against inadvertent rotation to a face down position. The location of the raft, is ideally within the walls of the life vest, protecting the raft from the shearing forces of entry, freeing the hands to assist entry and recovery once in the water. An envelope for containing the rescue product could be provided so that it could be attached to the inside or outside of any current life vest and thereby confer the protective advantages to all owners of a life vest without having to incur the cost of buying a new life vest. This would allow all current owners of a safety vest to upgrade to a dual chambered separating water survival system. This attachment system employs a hook and loop fastener looped through the arm holes and is universally adaptable to all life vests, of all sizes. Any releasable fastener such as buttons, zippers, snaps, hook and loop, etc would allow for the rescue product and its stowage and release system to be located comfortably centered both up and down as well as side to side. While it could be positioned outside the life vest, its inclusion within the life vest will ensure its secure attachment. The inflation of the rescue product is determined by its use, cost and available stowage space but since oral inflation is not restricted by shelf life, it is always present and most affordable. Inflation via a manifold will allow the rescuer to provide a rapidly inflated life ring to help stabilize the victim through the initial insult and then provide a float while the remainder of the chambers are inflated. In the current embodiment the rescue product is built into the safety vest or floating cushion, if anyone in the water intentionally or accidentally and is sequentially inflated through a series of rescue products that culminates in a raft for removal of the individual from the hypothermic effect of the water.

An additional advantage of the disclosed invention is directed to the adaption necessary when the safety vest is used underwater by the scuba diver, in this application the heads up safety vest would be called a buoyancy compensator or BC. Because of the serious consequences of rapid ascent on pressurized lungs, in addition to the reliable regulation of the high lift surface flotation component of the buoyancy compensator, the primary buoyancy compensation bladder should be variable size. By design the buoyancy compensator is to be used underwater where it is vulnerable to inflation from entrapped pressurized air at two to three atmospheres, as well as subject to inflation from panicked misuse or mechanical failure of the power inflator, all causes leading to the same result, dangerously rapid ascent rates. The volume of the bladder should be tailored to the dive environment. The dedicated buoyancy compensator can be adjusted to the lowest volume needed to accomplish the goal of compensating for compression of thermal protective gear and the resultant loss of buoyancy. As the dive environment changes, so does the need for thermal protective gear. In tropical water minimal or no protective gear is worn and therefore the diver has nothing to compress and so experiences no loss of buoyancy at depth. For the diver in a bathing suit, the need for a power inflatable bladder underwater is limited to the shift in buoyancy that occurs in their air cylinders, and usually is well under 5 or 6 pounds of lift. This chamber is only needed to cover the initial overweighting needed to allow the diver to be neutral at the end of the dive in order to make a safety stop. This product should not be called a buoyancy compensator as a first step in reeducating the diving population about the dangers of power inflatables underwater.

In cold water, at 120 feet of depth, a 190 lb. diver in a ¼ inch neoprene wet suit experiences a loss of 9 lbs. of lift due to compression of the wet suit. Most sport divers are smaller and therefore are wearing less neoprene, dive in warmer waters and/or making shallower dives. There is no justification for subjecting a diver to unnecessary risks of rapid ascent. Due to the extreme danger of pulmonary rupture and secondary air embolism that results from a rapid uncontrolled ascent it is imperative that the buoyancy compensation chamber be restricted to the lowest volume absolutely necessary to accomplish its goal. Any lift over and above the minimum amount exposes the diver to unnecessary risk. The diver doing repetitive dives in one day is advised to do their deepest dive of the day first and will need a buoyancy compensation capacity commensurate with their thermal protective gear and dive plan. As the dives become shallower and consequently warmer as well, the volume of an adjustable buoyancy compensator can be reduced, and consequently reduce the divers exposure to the risk of rapid ascent. Recommended ascent rates are dropping from 60 feet per minute to 20–30 feet per minute. The medical literature notes that a 30 lb. buoyancy compensator can produce average velocities in excess of 250 feet per minute from less than ten feet under the water. For several generations, divers dove without a buoyancy compensator so its use cannot be construed as critical. The advent of this convenience product has resulted in ballistic ascent rates because of the air entrapped inside the product which is pressurized at depth which then doubles and possibly quadruples upon ascent depending on the initial depth. An inexperienced diver in an "out-of-air" situation is prone to forget about the intellectual concept of arterial gas embolism in the hypoxic and hyper-capnic driven race to the surface, only to die from an arterial gas embolism before ever getting a chance to drown. Drowning is a slow, reversible process that lends itself to rescue for quite some time after the event, unlike arterial gas embolism. When using an adjustable dedicated buoyancy compensator the diver can very precisely control their exposure to the dangers of an emergency ascent through the water column and thereby significantly reduce the risks of rupturing a lung and suffering an arterial gas embolism to the brain or heart or similarly reduce the risks of suffering the bends because of missed decompression stops.

An alternate location for a separating forward surface flotation chamber is for its inclusion within the shoulder straps. The redundant personal flotation device is designed to be separated away from the remainder of the dive gear to provide complete duplication of personal flotation devices in the event of failure of the primary chamber. The chamber can also be used as a rescue, signaling, salvage product or snorkeling vest.

Appropriately sized releasable shoulder trim weights offset the operation of the buoyancy compensator underwater, improving swimming position, decreasing frontal area, producing less hydrodynamic resistance and consequently less diver fatigue. Once again, the shoulder trim weight results in a reduction of the consolidated weight belt with its inherent advantage of protecting the diver from accidental loss of all ballast at one time.

In summary, a multiple chambered life vest can be of a low volume, low lift, and low profile design as long as at least two points in need of buoyancy are covered, behind the neck and at the umbilicus and one point of ballast along the vertical posterior axis. Excessive buoyancy can be extremely detrimental either because the product is not actually worn because it is too bulky or because side righting moments have been created that jeopardize the airway. The separating chamber in the hands of a conscious, capable user can be removed providing a signaling device for facilitating search and rescue efforts or used as a rescue board minimizing the risk associated with attempting to rescue another victim who has become hypoxic. After the initial insult has been survived the user can deploy the incorporated inflatable rescue product that sequentially inflates into a life ring, then rescue board and distress marker and culminates in a raft to remove the victim from the water with its inevitable and often rapid hypothermia. The entire water safety survival system constructed for a single use application could easily fit within the air line seat cushion, dramatically improving survival statistics for accidents at sea.

The multi-chambered heads up safety vest as adapted for the scuba diver allows for reliable segregation of a variety of high lift surface flotation chambers while underwater. In addition a variable volume dedicated buoyancy compensator allows the diver to further reduce the amount of lift attached to the smallest amount necessary for a particular dive environment. The combination of these two improvements will markedly reduce the largest cause of pulmonary barotrauma, and secondary embolism, a major cause of injury and death in the field of diving.

The inclusion of a couple of pounds of weight integrated into the posterior axis of the victim's vest will allow the victim to overcome numerous minor righting moments that can place the airway of the exhausted or distressed victim under the water leading to drowning another major cause of death in the sport of diving. The benefits of the tank compensating keel weight are so dramatic that they can be included into a separate product that can retrofit existing buoyancy compensators, converting them into a heads up product. The inclusion of the multi-function rescue product within the walls of the buoyancy compensator confers on that diver the ability to respond to a number of problems frequently encountered by the diver in rescue, marking and salvage.

Thus, a water safety and survival system that provides a multi-chambered personal flotation device that operates on minimal volume to create a single heads-up righting moment that reliably stabilizes an unconscious victim with his airway out of the water is disclosed in one embodiment. This is accomplished with a minimal amount of lift, less deflated bulk, improved cosmetic appeal, and reduced cost. These combined advances result in a safety vest conducive to actually being worn, a key feature for a safety vest. The system also provides for incorporation of a separating second inflatable life ring, rescue board, artificial respiration assist platform, and ultimately a raft for removal of the victim from the water to protect him from hypothermia. This sequentially inflated, multi-chambered, multi-faceted inflatable rescue product is incorporated within the body of the safety vest. The incorporation of a wide range of rescue products into the body of the person flotation device will reduce the incidence of that dual tragedy that occurs when the rescuer becomes the second victim. This water survival system, when adapted to the special needs of the scuba diver, requires the incorporation of a tank compensating counter-weight to offset the deleterious effects of a buoyant empty tank whose buoyancy can force the diver's airway under the water. Further adaptation for use underwater also includes a system to adjust the volume of the primary buoyancy compensation chamber and variable valve for segregation and reliable regulation of one or more additional surface flotation chambers underwater. The design of the separating chambers coincides with responsibilities and goals of the diver. These and more modifications for the safe underwater use of the heads-up safety vest are critical in order to mitigate the risk of rapid ascent and its consequences, arterial gas embolism and decompression sickness.

In accordance with these and other objects which will become apparent hereinafter, the instant invention will now be described with particular reference to the accompanying drawings.

DESCRIPTION OF THE PREFERRED EMBODIMENTS

Figure 1:
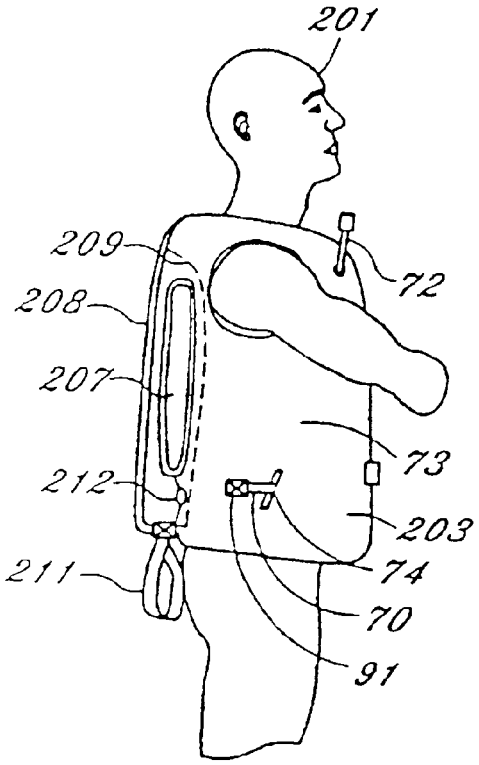
FIG. 1 is a view of a personal flotation device shown incorporating the multi-function rescue product within the back wall of the vest.
Figure 48:
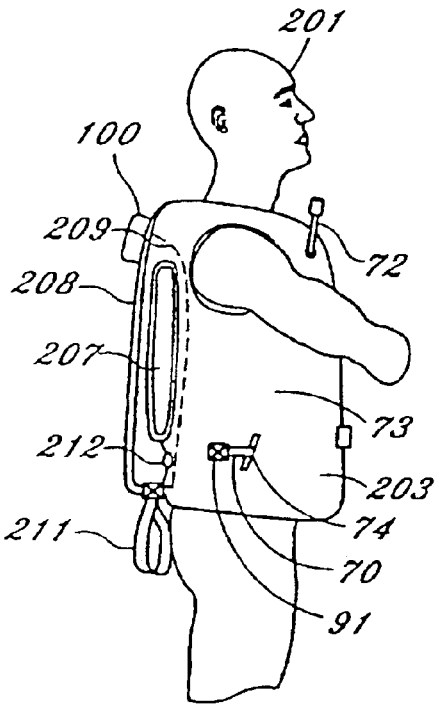
FIG. 48 is a view of the personal flotation device shown in Figure and incorporating a counterweight member.

FIG. 1 shows victim 201 wearing a vest 203 that can function separately as a snorkeling vest, personal flotation device for boating or alternately hooked up to the primary bladder of a buoyancy compensator through quick release means 91 and hose 70 that is attached within pocket 74. Vest 203 can also be inflated through oral inflation means 72. Additionally, vest 203 can be incorporated with a ballast means 100 (FIG. 48). A multi-function rescue product and raft 207 is stowed within the back pocket of the lift vest between the outer wall 208 and inner wall 209. A retrieval strap 211 opens the pouch formed by wall 208 and wall 209, and is wrapped around raft 207 allowing the user to remove rescue product and raft 207, comprised of an expansible material allowing inflation chamber portion 73 located along the perimeter of the back to roll forward upon inflation.

Figure 2:
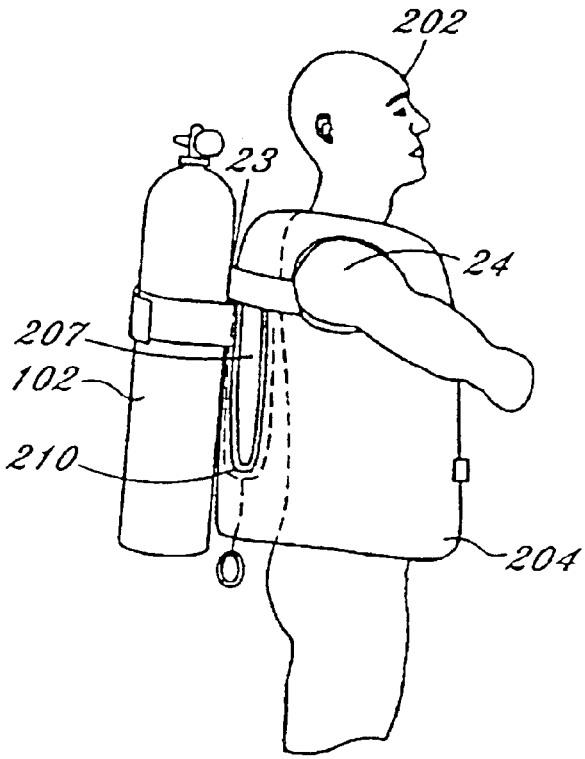
FIG. 2 is a view of an existing buoyancy compensator with the multi-function rescue product attached.

FIG. 2 shows a diver 202 adapting an existing vest style buoyancy compensator 204 to carry the rescue product 207 within a containment pouch 210, held in place by band 23 that is supported by arm holes 24. A retrieval strap 211 is wrapped around rescue product 207 so that it can be removed from the containment pouch 210 without having to remove the vest 204. The scuba tank 102 is standard.

Figure 3:
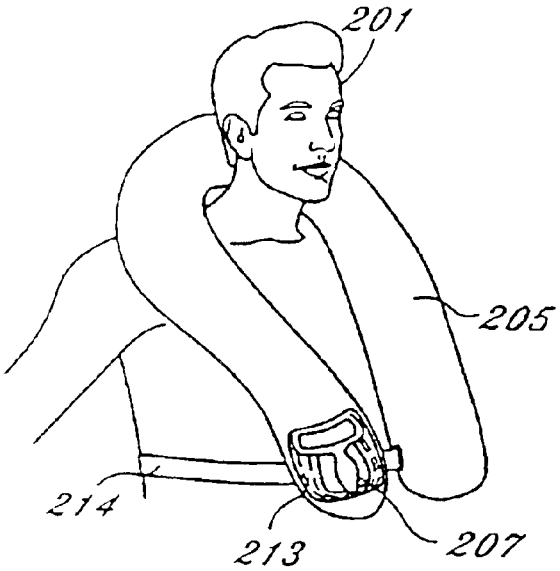
FIG. 3 is a view of an airline life vest carrying a multi-function water rescue safety product.
Figure 49:
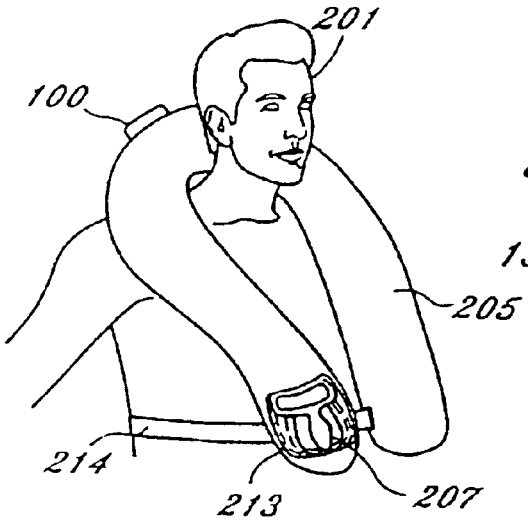
FIG. 49 is a view of the airline life vest shown in FIG. 3 and incorporating a counterweight member.

FIG. 3 shows a typical inflatable vest 205, as might be worn by an airline passenger 201, that is strapped to the victim by strap 214, in the event of a water landing. The typical vest 205 is modified by addition of a containment pocket 213 that stows a single use rescue product 207. Additionally, vest 205 can be modified by the addition of a counterweight 100 (FIG. 49).

Figure 4:
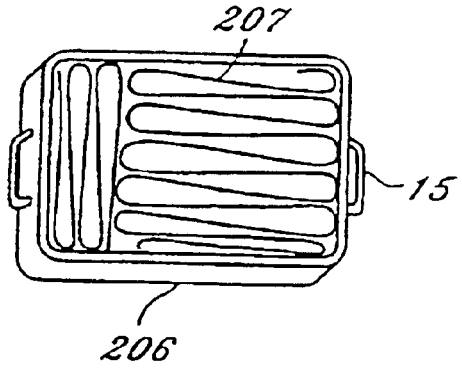
FIG. 4 is a view of an airline seat cushion modified by the inclusion of an ultra lightweight disposable multi-function rescue safety product.

FIG. 4 shows an airline cushion 206 containing rescue product 207. The victim puts their arms through straps 15 to secure the cushion 206 to the victim during water entry.

Figure 5:
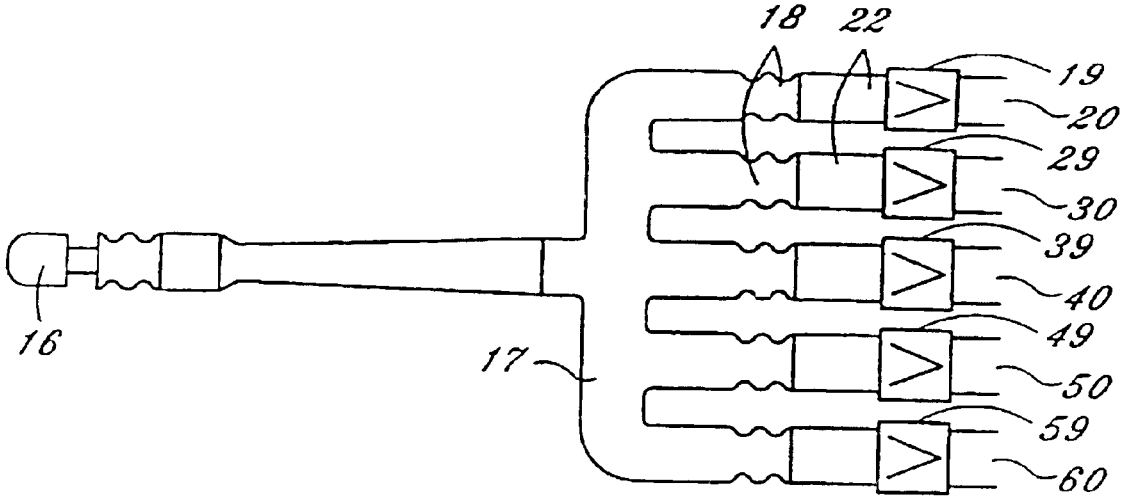
FIG. 5 is a view of an inflation manifold.
Figure 6:
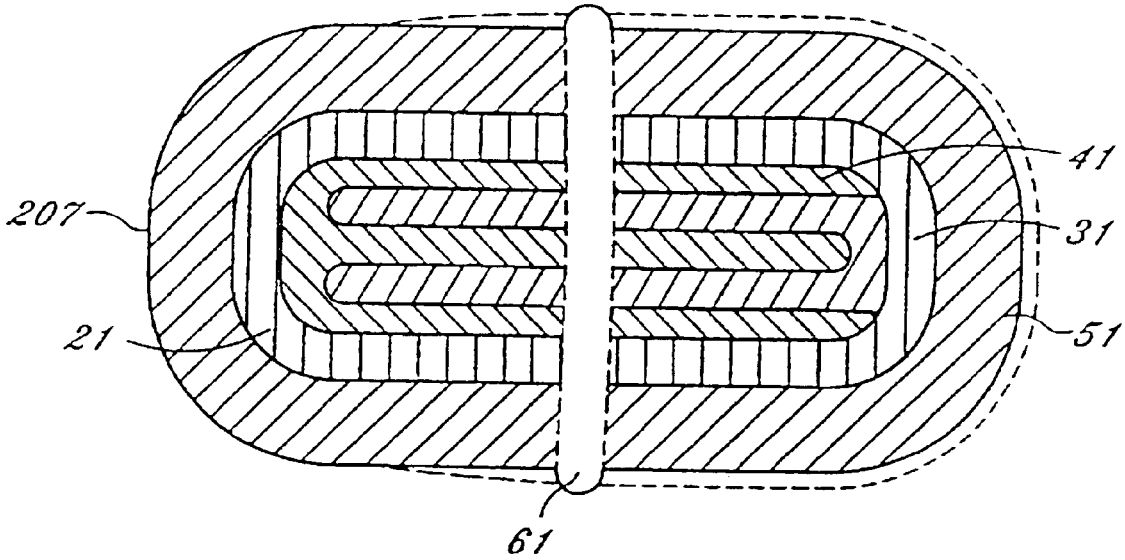
FIG. 6 is a top view of a multi-chambered rescue product.

FIG. 5 shows a manifold device 17 that connects an oral inflator 16 through barbed fittings 18 to a series of one-way check valves that can also function as variable pressure relief valves 19, 29, 39, 39, and 59 that connect via tubing 20, 30, 40, 50, and 60 to a series of inflatable chambers as are demonstrated in the next drawing, FIG. 6.

FIG. 6 shows-a multi-function rescue product and raft 207, comprised of life ring 21 which is inflated by tube 20 which because it has the largest, diameter tubing and because the pressure relief valve 19 has the lowest relief pressure setting, will inflate first. Inflation chamber 31 or the floor is the second to inflate. Chamber 41 is a second chamber in the floor and because of the setting of the pressure relief valve and/or the diameter of tube 40 would be the third chamber to fill. The first three chambers; the life ring 21, and the floor chambers 31 and 41 form a rescue board or distress marker. The next chamber is a wall tube 51 and that can be inflated while resting on combined chambers 21, 31, and 41. The final chamber 61 forms an arch, supporting a protective canopy. In its last configuration, the multi-function rescue product 207 can be inflated to a raft constructed from radar, solar, and infrared reflective material.

Figure 7:
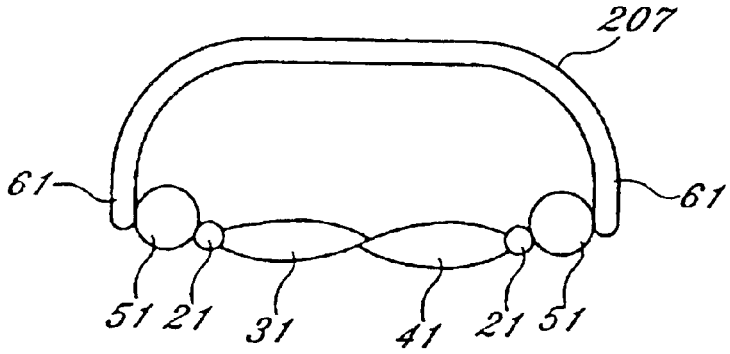
FIG. 7 is a cross section view of the multi-function rescue product fully inflated.

FIG. 7 shows construction of rescue product 207 in cross section, highlighting the various chambers and their sequence in inflation, life ring 21 first, portion of floor 31, remainder of floor 41 second, high volume tube wall 51 third, arch canopy tube 60 last. Ideally, the floor is doubled or tripled to provide thermal insulation from the water and puncture resistance.

Figure 8:
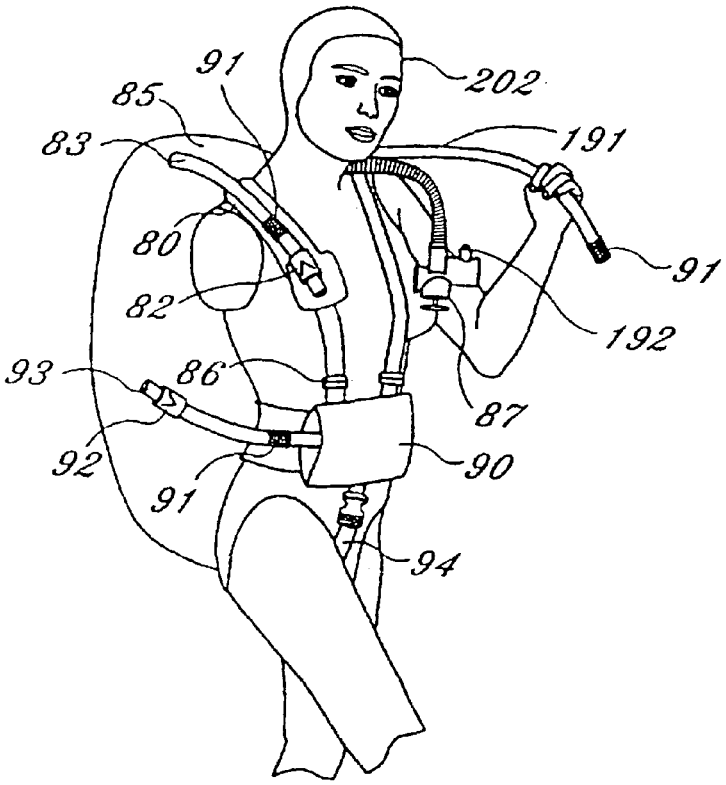
FIG. 8 is a view of a face up personal flotation device modified for scuba diving.
Figure 9:
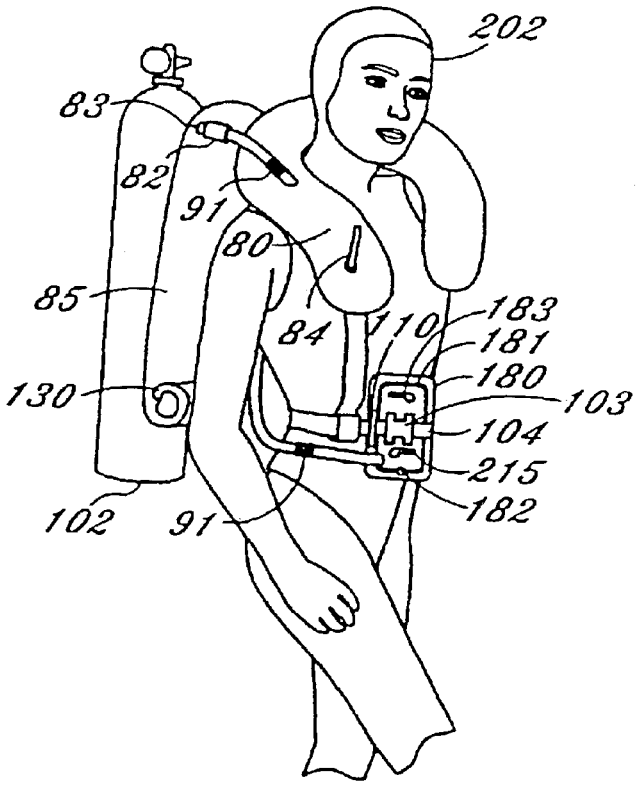
FIG. 9 is a view of the scuba diver with an inflated separating horse collar, and self rapturing emergency ascent chamber.
Figure 50:
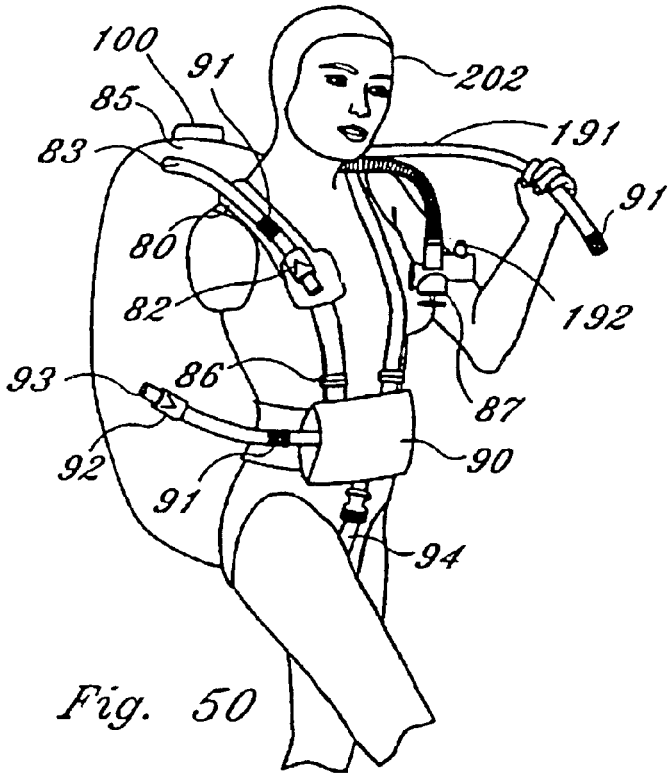
FIG. 50 is a view of the face up personal flotation device shown in FIG. 8 and incorporating a counterweight member.

FIG. 8 scuba diver 202 is shown wearing a heads up, multi-chambered, dedicated, rear mounted, adjustable buoyancy compensator having an inflatable chamber 85 connected with hose 83 through quick release coupling 91, and through one-way pressure release valve 82 to a releasable inflatable shoulder harness 80 that is stowed in a folded configuration. In FIG. 9, the shoulder harness 80 is inflated. In FIG. 8, an alternate or concurrent surface flotation bladder having an inflatable chamber 90 can be connected to buoyancy compensation chamber 85 by tube 93, which is regulated by one-way check valve 92, and can be separated from the diver for rescue, salvage or marking activities by quick release coupling 91. In FIG. 8, it is noted that the life vest comprised of inflatable chambers 85 and 90 is snug but releasably attached to diver 202 by a crotch strap 94. The diver 202 in FIG. 8 is holding an air hose 191 which couples to the male quick release coupling 192 on the power inflator 87, or can be used to inflate rescue product 207 of FIG. 2 or can be used as a high pressure air source for the rapid inflation of chamber 90 when it is being used in a rescue attempt. Additionally, a counterweight 100 can be provided (FIG. 50).

Figure 10:
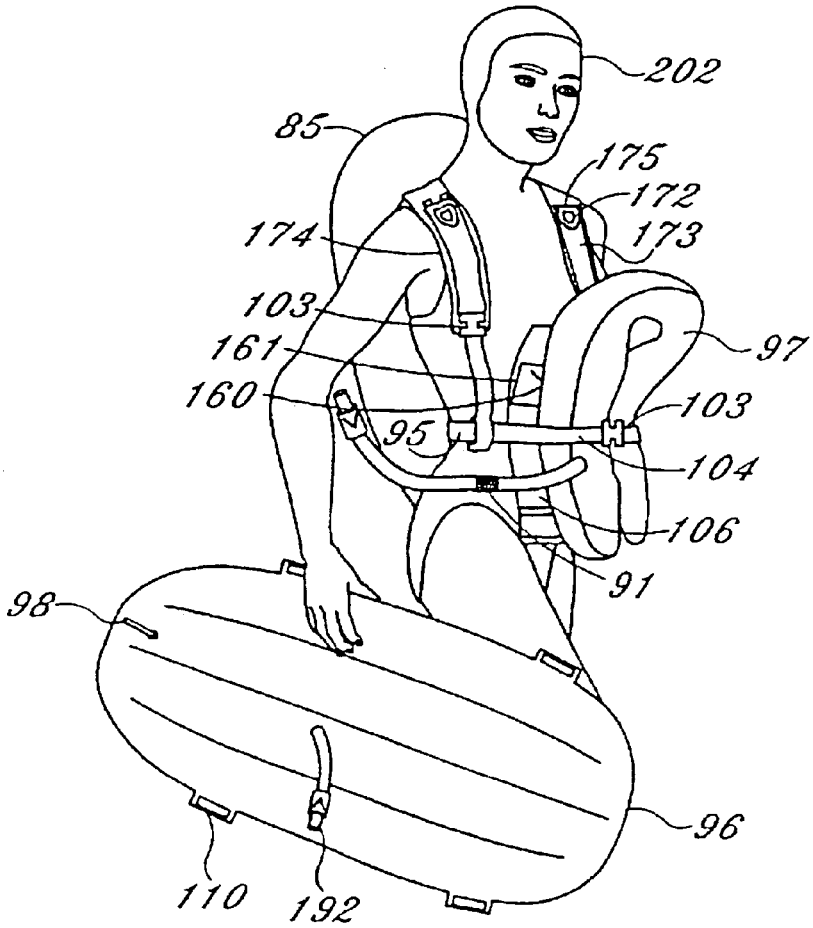
FIG. 10 is a view of the inflatable cummerbund, with a releasable forward chamber, carrying an alternatively forward chamber in the form of a float.
Figure 51:
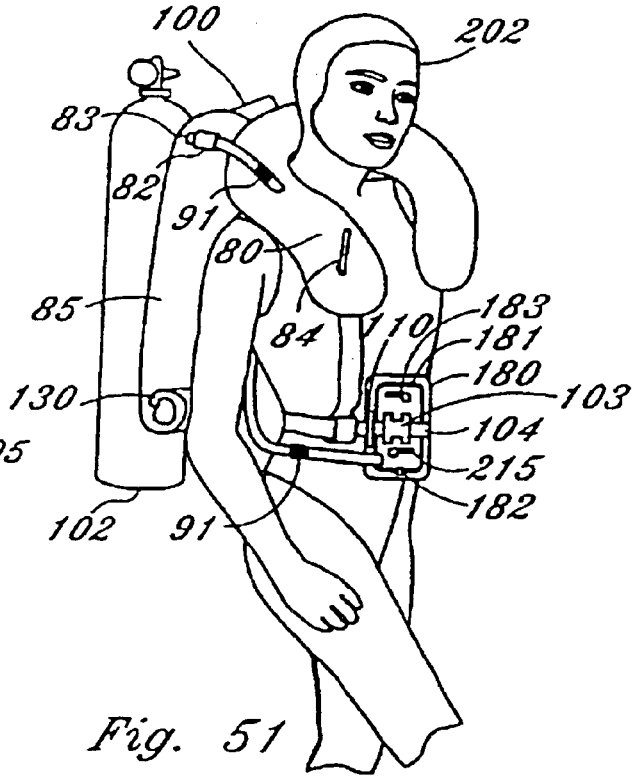
FIG. 51 is a view of the scuba diver with the inflated separating horse collar shown in FIG. 9 and incorporating a counterweight member.

FIG. 9 shows an adjustable buoyancy compensation chamber 85 reduced in volume by rolling up the side chamber as shown at 130. An automatic rupturing emergency ascent chamber 180 is inflated from buoyancy compensation chamber 85 through quick release coupler 91, or by a separate compressed gas cylinder such as a CO2 cylinder 215. Standardized retaining strap 110 as found on all the interchangeable forward bladders. Strap 110 keeps bladder 180 from separating from diver 202 until the quick release buckle 103 is opened. Retaining band 104 is expandable allowing for the forward chamber to expand away from the diver upon inflation. In an uncontrolled ascent the diver is unlikely to operate the venting mechanism 183 in which case a rupture plug 182, can be provided, which crosses a weld line 181 weakening it so that as the chamber 180 pressurizes upon ascent, it will rupture out at the weakened point, thereby reducing total lift attached to diver 202 and helping to control the ascent velocity. In FIG. 10 diver 202 demonstrates two of a wide variety of different releasable forward chambers indicated generally as inflatable means 90 stored in the waist band in FIG. 8. Additionally, a counterweight 100 can be provided (FIG. 51).

FIG. 10 shows the diver 202 whose waist band 95 is retaining releasable separating forward chamber 97 which is a redundant horse collar life vest and rescue product. Expansible element 104 stretches upon inflation of the forward chamber 97. In an emergency the horse collar vest 97 can be released from the divers buoyancy compensator by quick release buckle 103. The same quick release buckle is used for releasing the shoulder strap as is standard in the art, and familiar to divers. After releasing the forward vest 97 from the waist, the diver then disconnects the horse collar life vest 97 from its source of power inflation the buoyancy compensator 85, by using the quick release coupling 91. Once the forward chamber has been separated from the rear chamber 85 and diver 202, it can be employed as a rescue board, tied off as a bottom marker, left at the surface to warn boat traffic, or held aloft as a high visibility distress marker. In FIG. 10, the diver 202 is carrying a rescue board, distress marker, surf mat as an alternate separating forward surface flotation chamber indicated as 96. Chamber 96 can be retained by guides 110 on strap 104 of the divers waist band. In FIG. 10, chamber 96 is shown with oral inflation means 98 and quick release coupling means 192 which couples to quick release coupling 91 thereby connected to the rear buoyancy compensator 85, or to the air hose from the air cylinder for more rapid inflation. Retaining flap 106 serves to store the releasable forward chamber 97 or 96. Pouch 160 is sealed by flap 161 and is used to contain a small amount of lead shot to offset the buoyancy of the materials used to construct the forward chamber as well as its containment system. On the upper shoulder straps of the diver 202 in FIG. 10, D-ring 172 is attached to hook and loop covering flat 173 that is attached to underlying fabric walls 175 to create a quick release pocket for a lead shot filled pouch 174.

Figure 11:
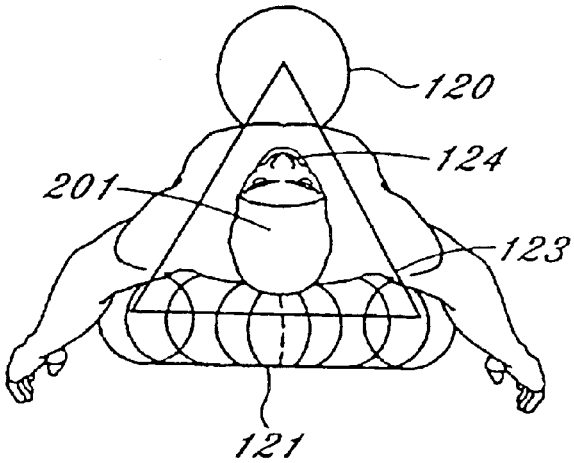
FIG. 11 is a view of the pyramidal structure with central forward buoyant chamber and rear buoyant chamber.
Figure 52:
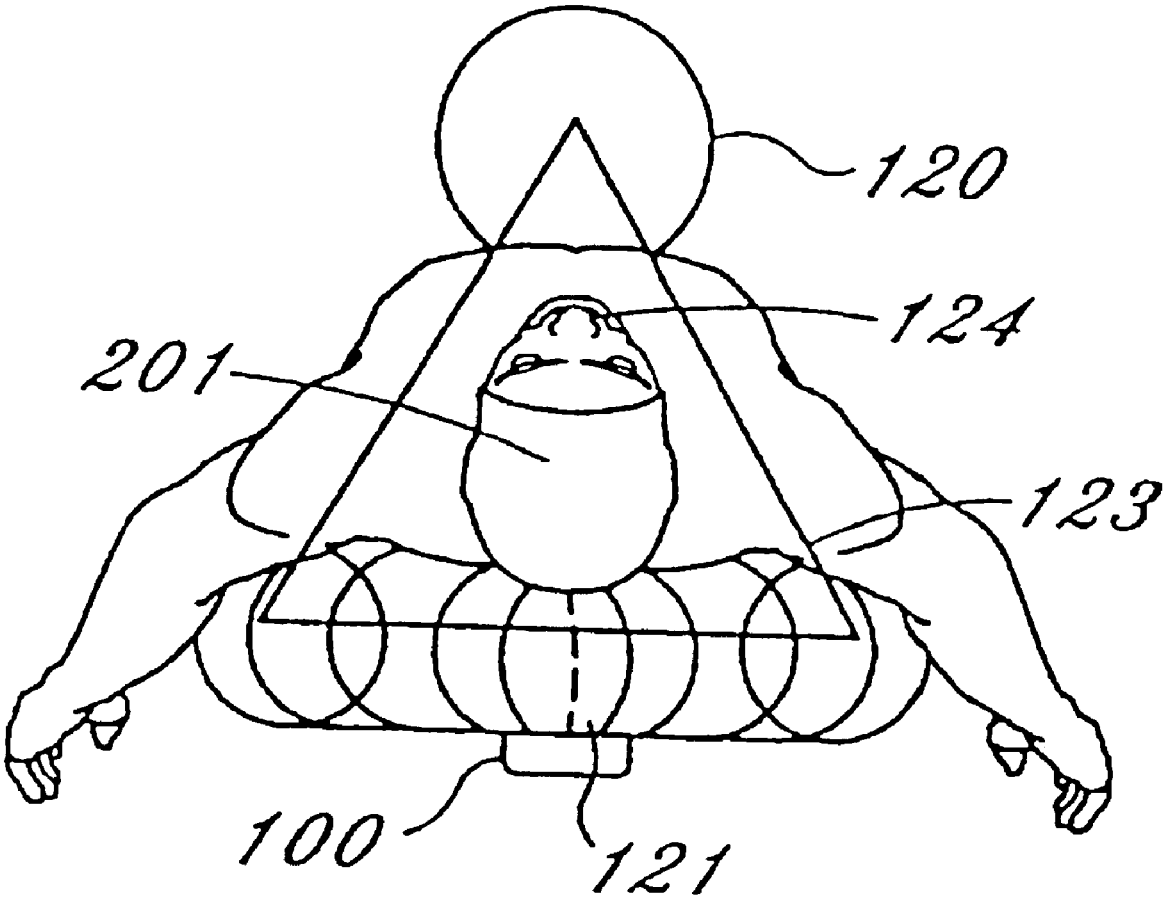
FIG. 52 is a view of the pyramidal structure with central forward buoyant chamber and rear buoyant chamber shown in FIG. 11 and incorporating a counterweight member.

FIG. 11 demonstrate the pyramidal structure of the multiple chambered heads up life vest. The vest is comprised of a rear U-shaped buoyant chamber 121 and the forward centrally located buoyant chamber 120. The triangle 123, formed by chamber 120 and 121 has a single righting moment, face up. The victim 201, and his airway 124 are maintained out of the water whether or not the victim is conscious. A counterweight 100 can also be provided with the life vest (FIG. 52).

Figure 12:
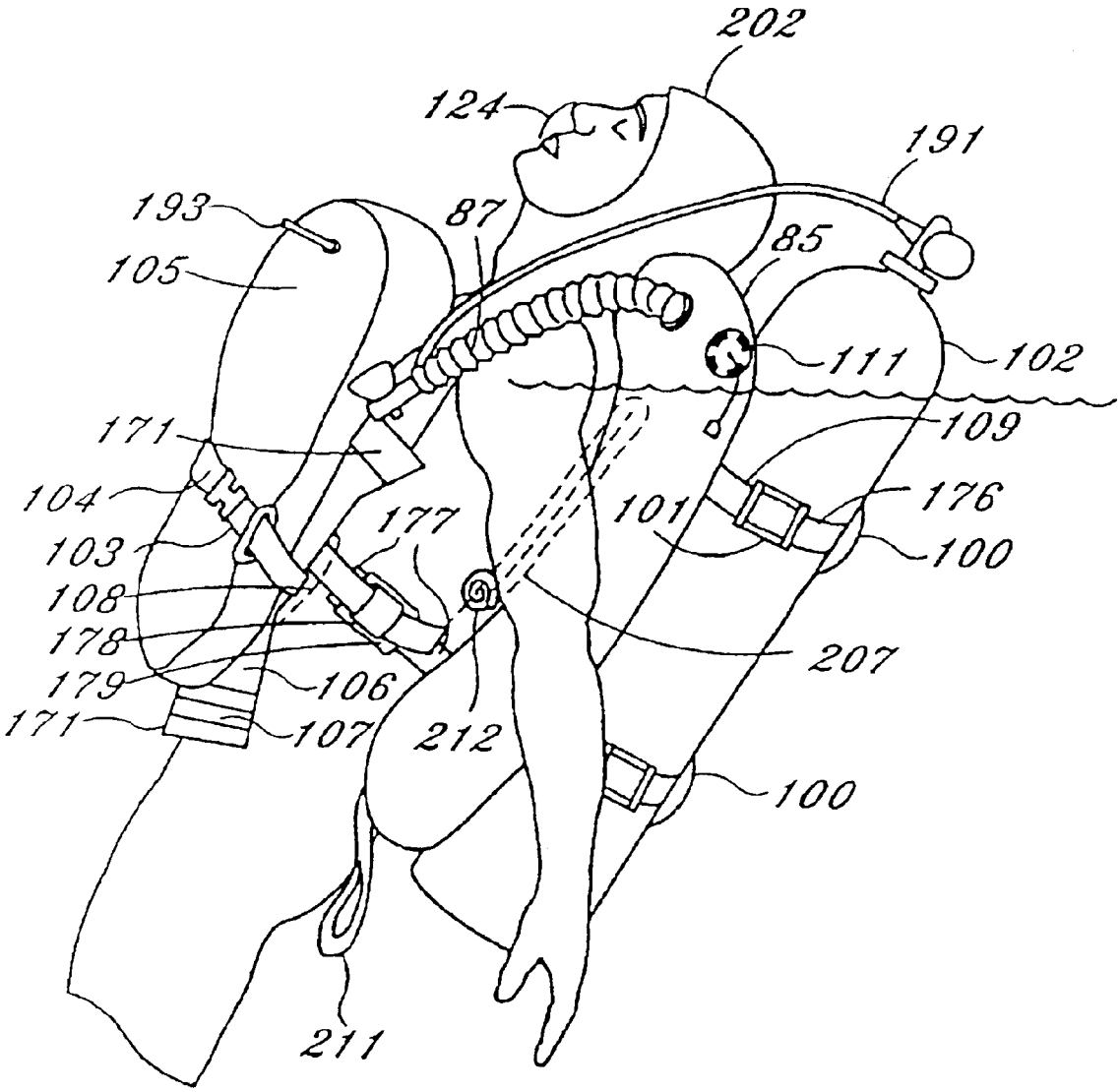
FIG. 12 is a combined view of the elements of the water safety and survival system as it is adapted to the scuba diver.

FIG. 12 shows a composite of the water safety and survival elements disclosed herein. In FIG. 12 the diver 202 is unconscious but his airway 124 is held out of the water. A generic centrally located inflated chamber 105 is retained by expansible strap 104 and could be released by quick release buckle 103 if the diver was alert and it was needed for rescue or for use as a distress marker for search and rescue activities. Waist band 95 is secured in place by buckle 178 which is mounted on a Velcro® base 179 that allows the waist buckle to be adjusted along the length of the left side of the waist band 177 to accommodate the variation in waist size that occurs as different types of thermal protective gear are worn. The buckle 178 is off to the side so that the generic forward flotation chamber 105 retains its critical central location. The forward chamber retaining flat 106 is attached by hook flap 108 to the loop material that covers the entire length of the waist band indicated as strap 95. This allows the forward chamber 105 to be quickly but securely adjusted to its central position. Operation of forward chamber 105 is regulated by the variable fabric valve 171 built into the retaining flag 106. The hook and loop components 171 of flap 106 can be varied by the inclusion of a reducer strip of hook 107. The size of the reducer strip 107 determines whether the flap 106 will open quickly under pressurized inflation from the rear chamber 85, open slowly or not at all. If the entire reducer strip 107 is removed the hook and loop means 171 are of sufficient strength to lock off the forward chamber. An over pressure valve 111 is located on the opposite side of the chamber 85 so that the diver can vary the position of the power inflator from the rear to the front by interchanging the power inflator 87 and over pressure relief valve 111. Rescue product 207 is contained in a pocket built into the rear wall of the buoyancy compensator 85 and is accessible by strap 211. Rescue product 207 is attached to the diver by a releasable lanyard 212. The tank compensating keel weight 100 is permanently attached to the tank retaining strap 109. Ideally, the tank compensating keel weight 100 is of a hydrodynamic conformation, made from a dense substance such as lead, coated in a soft film such as plastic so it will facilitate keel weight 100 being securely clamped in place by cam buckle 101. The soft coating will also avoid damaging the protective coating of the tank 102. The tank compensating keel weight 100 may be replaced by a standard lead weight so that the diver traveling abroad will not have to transport a lead weight. A diver in tropical waters may only require 5 pounds to descend while use of a dry suit in cold water can require 40 lbs. or more to be able to submerge, the greater the weight of keel weight 100, the stronger the face up righting moment it will generate. As the weight belt is increased because of the use of buoyant thermal protection, it is critical the keel weight 100 be increased. Regardless of the size of the keel weight 100 it is critical that it be located exactly opposite the diver and thus its position must be adjustable so that as the diver changes between diving cylinders of different diameters, keel weight 100 can be easily adjusted, by a non-user, to maintain its critical position. Ideally strap 109 is marked with a scale 176 to guide the diver in selecting the correct placement of keel weight 100 on cylinders of different diameters. If the keel weight 100 is slightly off center, it could summate with an imbalanced weight belt and stabilize the diver in side up position which will allow the airway 124 to submerge. Because the position of the keel weight 100 cannot be compromised, the cam buckle 101 is moved to a less accessible position on the side. A waist buckle 178 is attached to a hook fastener base 179 that allows it to be positioned anywhere along the left side of loop fastener covered waist band 177.

Figure 13:
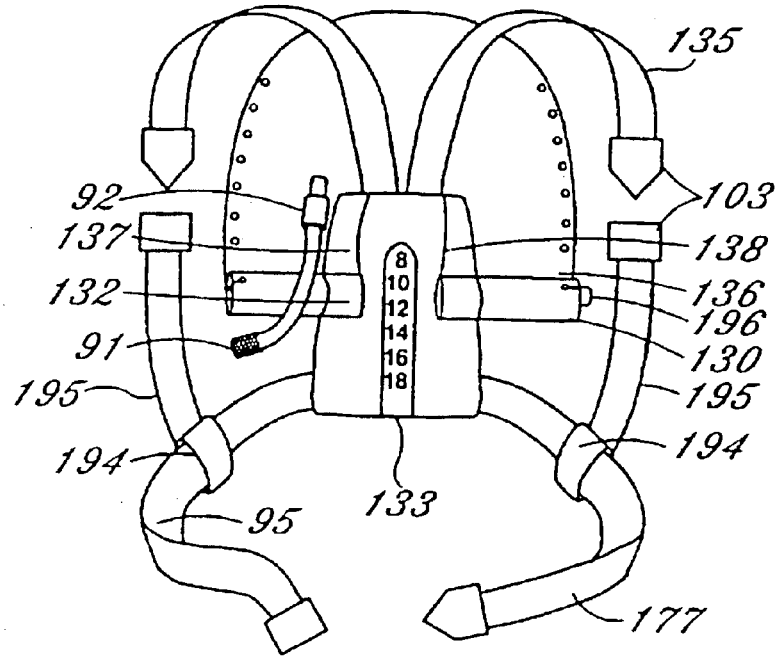
FIG. 13 is a front view of the adjustable buoyancy compensator.

FIG. 13 discloses one of many designs for the construction of an adjustable buoyancy compensator 85. The portion of the buoyancy chamber that is held inaccessible to inflation is indicated as a rolled up portion of the buoyancy compensation chamber 130. The loop portion of a hook and loop fastener forms the inside back of the buoyancy compensator and is indicated as 131. Loop 131 serves to attach the side chamber 136 by hook strips 132 to the body of the buoyancy compensator 85. Flap 138 is formed from the forward facing loop strip 137 and the rear facing hook strip 132. As the volume of the buoyancy chamber is reduced by rolling up the side chambers, the hook strip 132 adheres to the loop strip 137 to form and secure the roll 130. Clip 196 secures the rolled up grommets to prevent the chamber from unrolling under pressure from the air in the buoyancy compensator 85. The portion of the buoyancy compensator behind the neck is indicated as 134. In the current drawings the side chambers 136 are reduced in an infinitely variable fashion and an indicator 133 informs the diver of the remaining amount of lift provided by the buoyancy compensator 85. The indicator 133 allows the diver to quickly return to preestablished buoyancy compensator lift volumes as indicated for a particular set of dive gear. Quick release shoulder strap buckles 135 rely on quick release buckle 103 and are common in prior art. The lower shoulder straps 195 rely on nylon webbing loop 194 to establish structural integrity and internal hook fastener for positioning webbing loop 194 on the loop fastener covered nylon webbing waist band 95 and 177.

Figure 14:
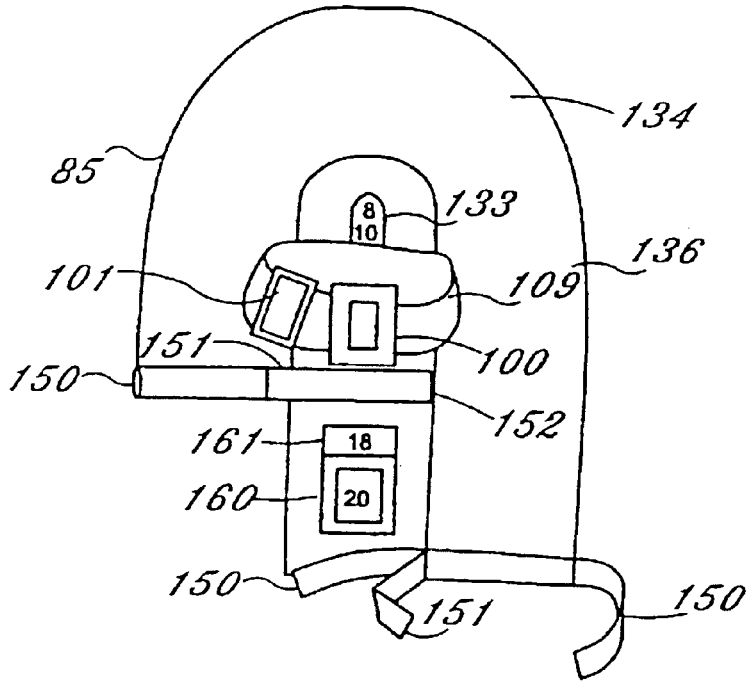
FIG. 14 is a rear view of an alternate adjustable buoyancy compensator.
Figure 15:
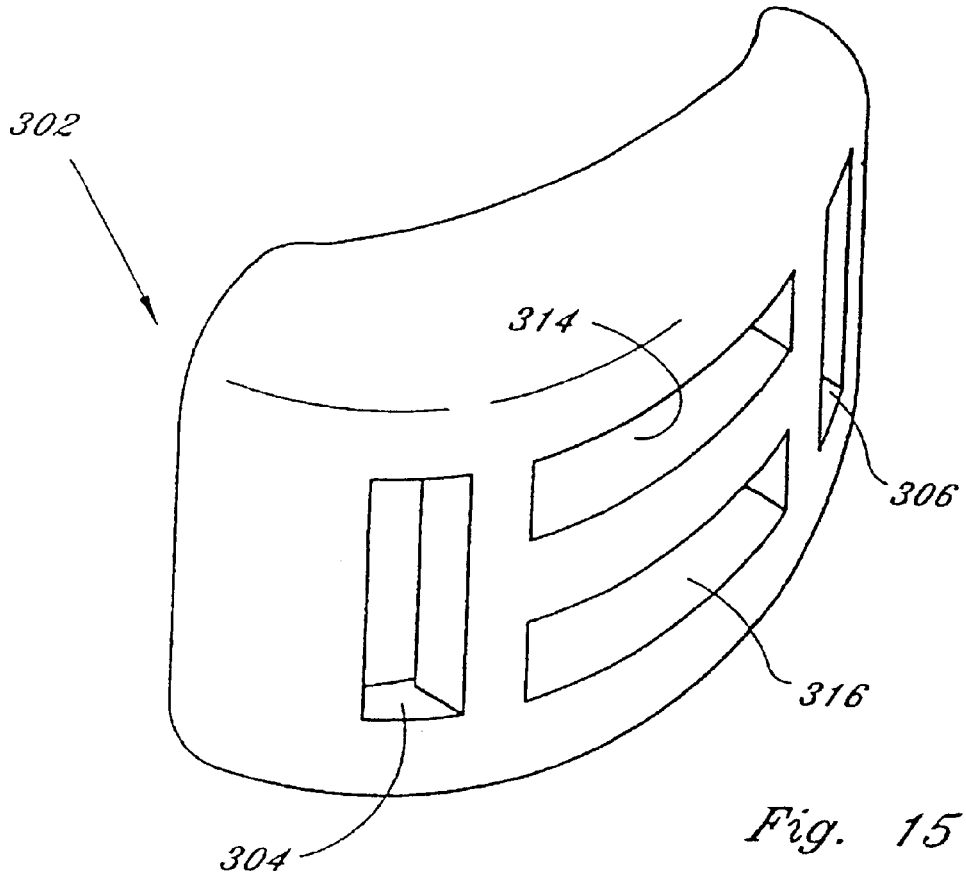
FIG. 15 is a front perspective view of a first counter weight member in accordance with the present invention.
Figure 16:
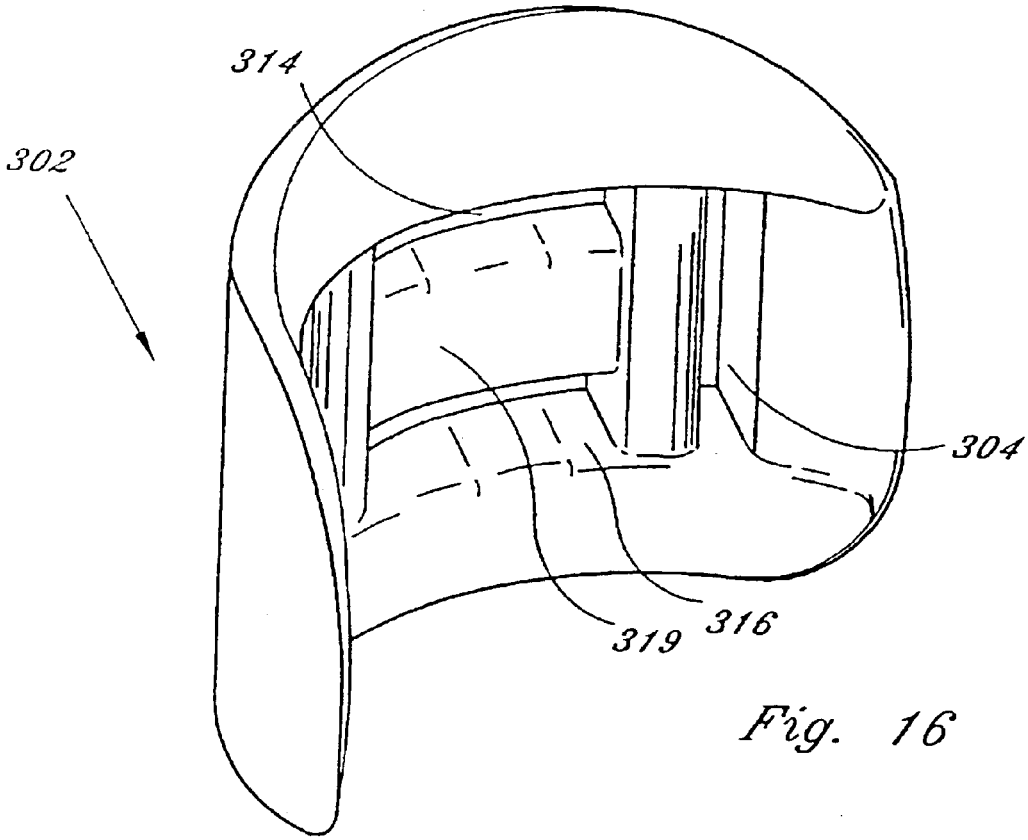
FIG. 16 is a back perspective view of the counter weight member illustrated in FIG. 15.
Figure 17:
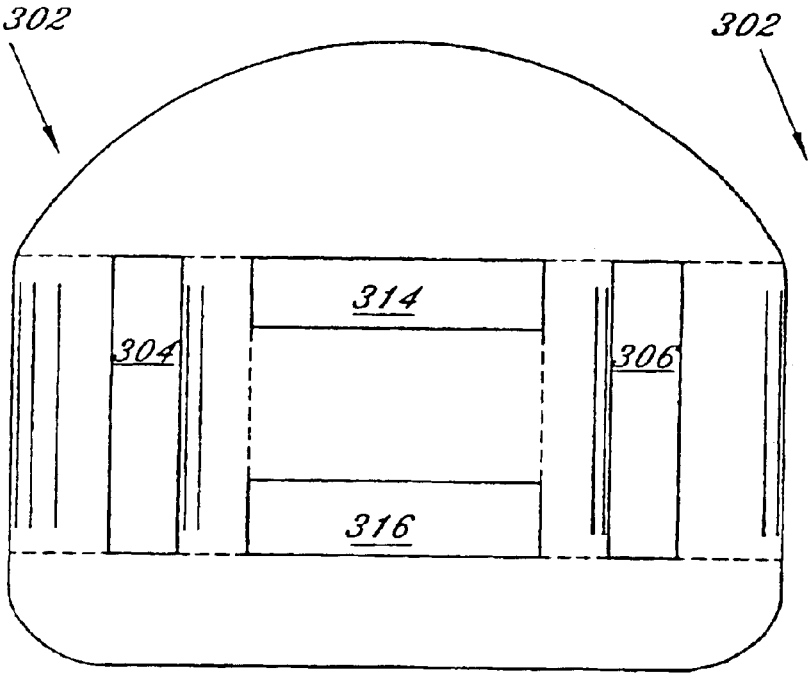
FIG. 17 is a front elevational view of the counter weight member illustrated in FIG. 15.
Figure 19:
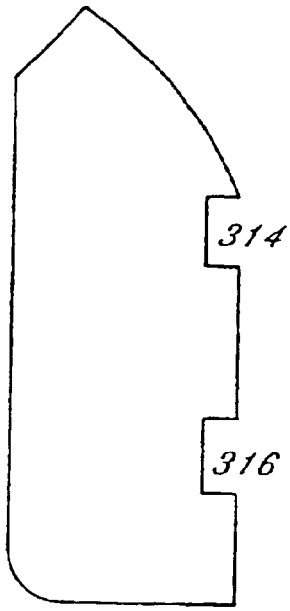
FIG. 19 is a side elevational view of the counter weight member illustrated in FIG. 15.
Figure 20:
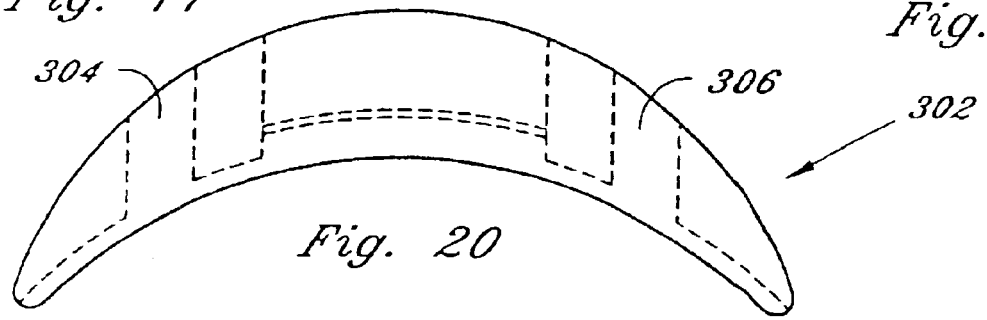
FIG. 20 is a top plan view of the counter weight member illustrated in FIG. 15.
Figure 18:
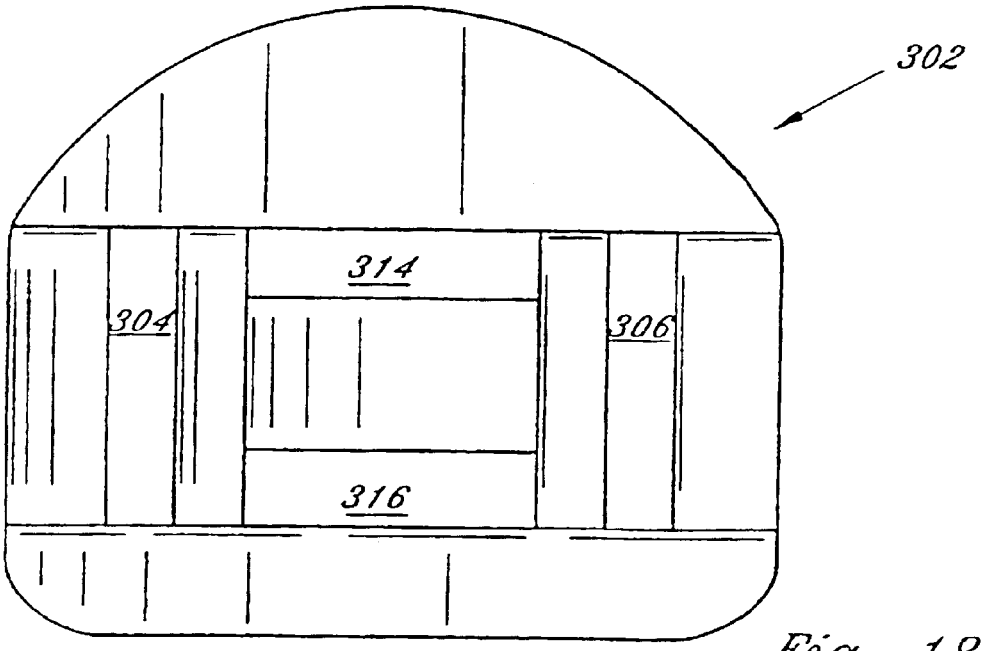
FIG. 18 is a back elevational view of the counter weight member illustrated in FIG. 15.
Figures 21, 22, 23, 24:
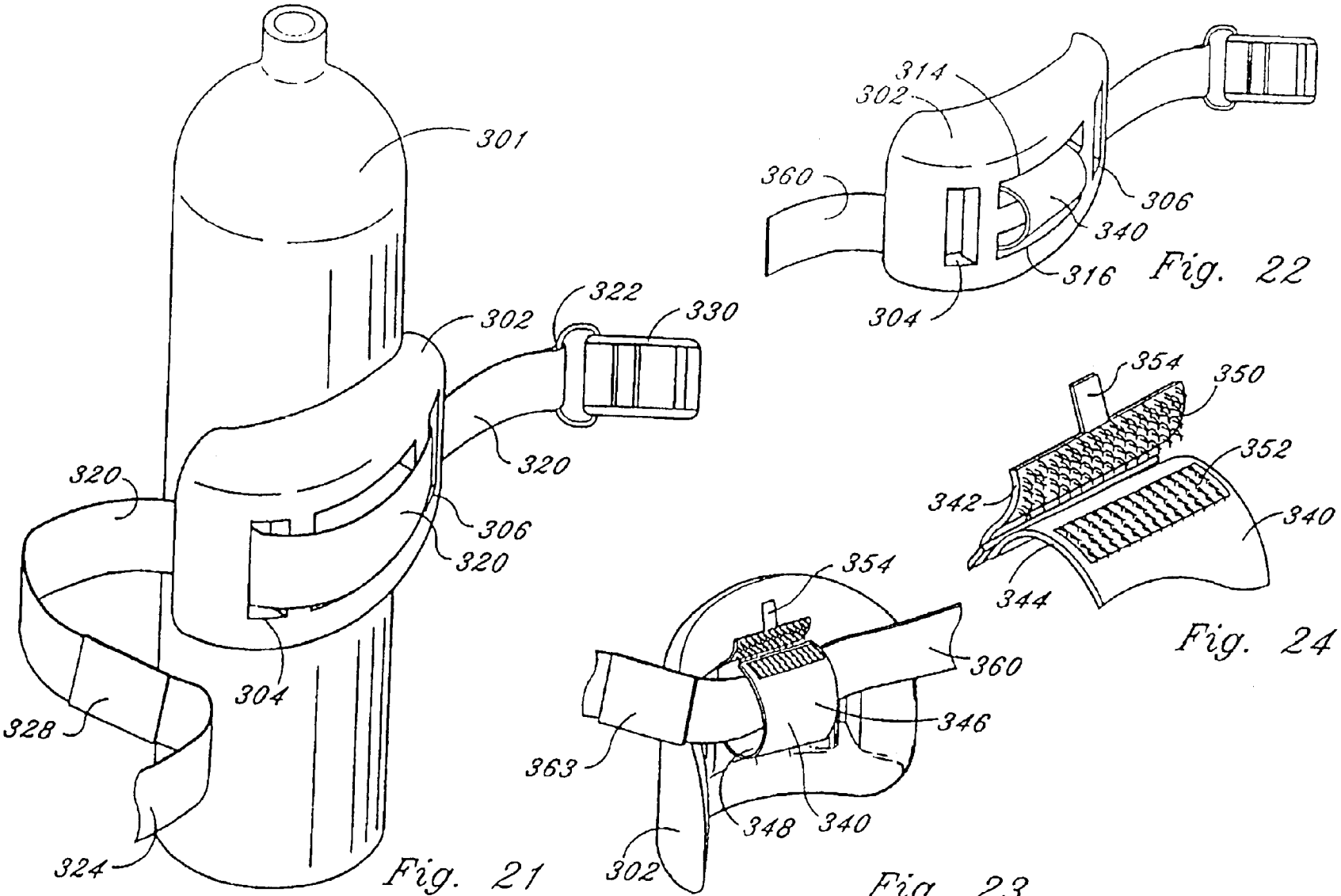
FIG. 21 is a front perspective view illustrating a first attachment embodiment for a first counterweight assembly in accordance with the present invention.
FIG. 22 is a front perspective view illustrating a second attachment embodiment for a first counterweight assembly in accordance with the present invention.
FIG. 23 is a back perspective view illustrating the second attachment embodiment for the first counterweight assembly.
FIG. 24 is a perspective view illustrating a connection portion of a coupling strap in accordance with the present invention.

FIG. 14 depicts another retaining system for reducing the volume of adjustable buoyancy compensator 85. Double sided hook strip 151 and double sided loop strap 150 are used to lock off the reduced portion of the buoyancy compensator chamber 85. Double sided hook flap 152 attaches the rolled up chamber securely to the loop covered body of the buoyancy compensator 85. The reducible portion of the buoyancy compensator chamber is indicated as 136. The portion of the buoyancy compensator 85 that supports the neck and head is indicated as 134. The keel weight 100 is threaded on tank band 109, that is secured to the air cylinder by cam buckle 101. The hook flat 161 seals off the lead shot filled pouch 160 used to neutralize the inherent buoyancy of the buoyancy compensator.

OPERATION OF THE INVENTION

In FIG. 1, the water enthusiast is shown wearing a traditionally designed vest 203 which could be used in any recreational water sport. The vest 203 contains a multi-function rescue product and raft 207 within its rear pocket. If the ocean kayaker should become separated from his kayak at sea the victim 201 could pull on lanyard 211 and remove the rescue product and begin inflating it. A releasable attachment cord 212 will keep the rescue product from blowing or washing away. Because the vest 203 includes quick release coupler 91, the vest can also eventually be used as a forward chamber with the appropriate dedicated buoyancy compensator if the user becomes certified in diving.

FIG. 2 shows that the diver 202 wearing a current vest style buoyancy compensator 204 can adapt the rescue product 207 contained in pocket 210 to be carried between the diver and the tank by use of a strap 23 which passes through the arm holes of the buoyancy compensator. Access and use of the rescue product 207 is the same as described in FIG. 6 below.

FIG. 3 shows the victim 201 of a common carrier accident wearing a traditionally designed inflatable vest 205, modified with pocket 213 which contains a single use multifunction rescue product and raft 207 constructed from a mylar film and vacuum packed much as a single use raincoat. After surviving the initial entry the product is inflated and used as a life ring, then rescue board or distress marker, and finally inflated to a raft if necessary to remove the victim from the hypothermic effects of the water.

FIG. 4 shows the airline or ferry safety seat cushion 206 containing the multi-function rescue product and raft 207.

The victim's arms are placed through straps 15. The cushion 206 provides minimal safety in the water. The incorporated rescue product 207 would confer dramatic improvements in survival at sea.

Referring to FIG. 5, as the user exhales through oral inflator 16, the air passes into manifold 17 that connects multiple chambers to the oral inflator 16. The air is directed to the appropriate chamber according to the diameter of the tubing indicated as 20, 30, 40, 50, and 60. The one way check valves 19, 29, 39, 49, and 59 create structural integrity for each of the chambers down stream. If a puncture should occur only that chamber will lose pressure. If the oral inflator fails, the manifold 17 at its barbed connectors 18 can be disconnected from connector tubes 22 allowing separate inflation through each check valve. The simplicity of a single oral inflator will help the victim focus on a single task. Obviously, separate oral inflators could be used and the significance of which oral inflator is to be inflated first could be printed on the raft in multiple languages.

FIG. 6 is a top view of the multi-function rescue product and raft 207, fully inflated. The life ring 21 because of its small diameter is inflated first and quickly because of its low volume. This life ring could be used by the individual or extended to a family member. The floor chamber 31 and 41 would be inflated next also because they are low volume. Once inflated the first three chambers forms a float that gives the victim a sense of accomplishment. Inflated chambers 21, 31, and 41 create a four foot rescue board for approaching a flailing, distressed victim. The float can also be held aloft as a high visibility distress marker signaling other victims or search and rescue efforts. The inflated floor also gives a platform for the victim to rest on. If necessary the victim can rest on the first three chambers as they begin inflating the high volume side wall tubes 51. Once inside the raft the infrared reflective mylar would help to offset further loss of body temperature. Finally, the canopy arch 61 is inflated and the victim creates an enclosed space that is highly visible to the naked eye as well as radar. The multiplicity of chambers confers protection from puncture.

FIG. 7 is a view of the inflated raft 207 in cross section. The sequence of inflation, 21, 31, 41, 51, then 61 shows how the life ring would convert to a rescue float and ultimately to a raft.

FIG. 8 shows the scuba diver 202 holding a pressure hose 191 with its common female quick release coupler 91 disconnected from the male quick release coupler 192 of the power inflator 87. The common female coupler 91 can be attached to any of the other incorporated chambers such as the horse collar vest which is deflated and stored in the shoulder straps indicated at 80, or any of a multiplicity of deflated chambers that can be interchangeably stored in waist band as indicated at 90 or in the pocket. The high pressure hose 191 is employed to effect a more rapid inflation in an emergency. For routine operation of the chambers stored in the waist band or shoulder straps, they are in fluid communication with the buoyancy compensator chamber 85 through quick release couplers 91 and check valves 92. The crotch strap 94 is the only way the user can be assured that he will not be separated from his inflatable rescue product in heavy surf. With the auxiliary chambers deflated and stored, the diver has a sleek profile with reduced hydrodynamic drag while swimming under water. Most importantly with the high lift surface flotation chamber stored it will not contribute its buoyancy to the total lift available to the diver under water.

FIG. 9 shows a diver 202 with a redundant separating shoulder mounted horse collar 80 inflated. The diver also is demonstrating the self rupturing emergency ascent chamber 180 inflated at the diver's waist. It is to be noted that the dedicated adjustable buoyancy compensator 85 has been reduced by rolling up the lower portion of the chamber as indicated at 130. If this reduced chamber was providing insufficient lift at a depth and the diver chose to attempt an emergency buoyant ascent the forward chamber 180 at the waist could be released. If the diver was out of air, the air pressure in the rear chamber would spill forward causing chamber 180 to inflate. Alternatively, chamber 180 can be inflated from its own compressed cylinder 215 when chamber 180 is disconnected at quick release coupling 91 or if air cylinder 102 and buoyancy compensator 85 are both empty. If the emergency ascent was uncontrolled, and the diver forgot to deflate chamber 180, it would self destruct at rupture plug 182, releasing its entrapped air, that had become pressurized because of the ascent. At that point the ascent rate would slow allowing the diver to regain control, further slowing his ascent rate to within the recommended rate of 20 to 30 feet per minute, rather than the ascent rates of 200 to 300 feet per minute, generated during an emergency buoyant ascent. If the diver should snag a fish hook in their primary chamber 85, then the horse collar vest stored in the shoulder straps would provide a redundant personal safety vest. In the event that the diver needed to ditch the dive gear, the power inflated forward horse collar safety vest can be quickly disconnected by quick release coupling 91. Alternatively, the horse collar can be separated and extended to the diver's buddy who has suffered a failure of his single chambered buoyancy compensator. If the diver was snorkeling the horse collar safety vest could be disconnected and inflated via oral inflator 84 and used independently from the remainder of the heads up safety vest.

FIG. 10 shows a diver 202 with a flap 106 which was used to enclose the flotation chamber 97 now shown in the open position. In front of flap 106 is the separating horse collar forward surface flotation chamber 97, inflated at the diver's waist. The forward chamber is retained by elastic webbing 104 that allows the chamber to expand away from the diver rather than constrict the diver's abdomen and therefore breathing. Quick release buckle 104 allows the diver to separate the forward bladder which can then be disconnected via quick release coupler 91. Once the flotation chamber 97 is free it can be used as a rescue float for approaching a hypoxic diver, held aloft as a distress marker, left floating at the surface to warn boat traffic of diver activity, used underwater as a bottom marker in search and rescue activities, or used as a small salvage device. For rapid emergency inflation the product can be stored in a pocket and connected to the air hose. Chamber 97 as it is currently shown is retained by strap 104 providing the central point of buoyancy that contributes to the heads up surface position. Though not required, the diver can be provided with quick release shoulder trim weights 174, retained by hook and loop fastener 173 and 175. The diver by pulling on D-ring 172 peels open the pocket and lead shot filled container 174 can fall away from the diver. The trim weights are exactly opposite the site of underwater buoyancy contained in the buoyancy compensator and helps the diver achieve an ideal balanced underwater and surface position. The diver 202 is also shown carrying an alternate forward or flotation chamber 96 which can be substituted for chamber 97 and secured to the diver by elastic retaining strap 104 which passes through strap eyelets 110 mounted on the edges of bladder 96. This larger float has all the same functions of the horse collar forward chamber 97 with the addition that it can be used as a transport raft for a disabled diver or act as a surf mat at the end of the dive for swimming back to shore.

FIG. 12 illustrates a composite of several of the disclosed inventions. The multi-chambered heads up safety vest modified for use by the scuba diver by inclusion of tank bands 109 which attach the tank 102 to a fully inflated adjustable buoyancy compensator 85. The tank bands 109 are longer than those currently located on buoyancy compensators in the marketplace. The extra length in tank band 109 is needed to allow the diver to thread on the tank compensating keel weight 100. The keel weight 100 can be located on the top, bottom, or on both tank bands 109 as needed. A diver in a bathing suit needs to locate the keel weight on the lower band. A diver wearing a buoyant thermal protective suit requiring a weight belt can shift the keel weight to the top tank band 109 to establish the ideal surface position. Cam buckle 101 is located off the side of the tank 102 so that the back side of the tank is available for placement of the keel weight 100. Over pressure relief valve 111 is located opposite the buoyancy compensator power inflator 87 allowing the two to be interchanged. The beginner is accustomed to the power inflator 87 coming over the shoulder but when located in this position power inflator 87 floats free and is often hard to locate underwater. When the power inflator 87 is mounted on the front of the buoyancy compensator chamber 85 it hangs straight down between the diver and the tank and is easily located when needed. The multifunction rescue product and raft 207 is located between the diver 202 and the tank 102. Lanyard 211 wraps around rescue product 207 allowing the diver to remove the rescue product 207 for use without having to remove any other dive gear. A generic forward chamber 105 is inflated and retained by elastic strap 104. The flap 106 includes a variable fabric valve comprised of hook and loop fasteners 171 that variably regulates the use of the forward chamber 105. Reducer hooks strip 107 decreases the amount of interactive surface in the fabric valve allowing the diver 202 to vary the operation of the fabric valve from automatic to semi-automatic, to manual. With the reducer strip in place the air pressure from the rear chamber is capable of forcing open the valve deploying the forward chamber without the diver needing to do anything. In the semi-automatic mode, the diver 202 partially removes the reducer strip 107, now the fabric valve 171 will swell because of the mounting air pressure, after a period of time flap 106 will eventually open. As the diver becomes more skilled and capable of operating the fabric valve 171 in flap 106 in the manual mode, he will totally remove the reducer strip 107. With no reducer strip 107 in place the strength of the fabric valve 171 exceeds the 2.5 psi over pressure relief valve 111 on the rear chamber or the small bore over pressure relief valve built into the oral inflator 193. On a rapid ascent from significant depths, pressure will build up at such a fast rate that the small bore oral inflator over pressure relief valve 193 cannot keep up and the forward chamber will rupture, protecting the diver from any further acceleration and will contribute to the diver's deceleration by removing the bubyancy contributed by the forward chamber. With no reducer strip 107 in place the high lift surface flotation device is safely locked away while the diver is underwater, reducing the amount of lift attached to the diver's body that entraps air or could be inflated by panic or mechanical failure of the power inflator 87. Waist band buckle 178 is attached to hook and loop base 179 that allows the diver to quickly and reliably shift the position of the waist band buckle 178 to adapt the product to different divers or the same diver with different thermal protective gear.

FIG. 13 illustrates one way that an adjustable buoyancy compensator 85 can be assembled from the front. The body of the buoyancy compensator 85 is covered with loop fastener 131. The inside edge of the side chamber forms a flap 138 which has loop fastener 137 on the front side and hook fastener 132 on the back side. As the chamber is rolled up the hook and loop adhere along the inside edge and clip 196 locks the outer edge from unwinding under pressure from the air contained in the buoyancy compensator. The adjustable buoyancy compensator 85 gives the diver the ability to further reduce the amount of lift attached to his body to the absolute minimum needed for each dive profile and dive environment. Reducing unnecessary risk of rapid ascent, embolism and the bends.

FIG. 14 shows an alternate way to reduce the volume of a chamber using hook straps 151 and loops traps 150. As the chamber is rolled up to the desired amount of lift as indicated on indicator gauge 133, straps 150 and 151 are fastened. The side chambers are attached to the loop body of the buoyancy compensator by way of hook strap 152. Hook flap 161 closes loop pouch 160 that contains lead shot to neutralize the inherent buoyancy of the buoyancy compensator 85 so that ballast is not consolidated onto the weight belt. Keel weight 100 is shown on the top tank band 109. There are many ways that the chambers could be secured after being reduced in volume such as by buttons, snaps, zippers, pins, constricting bands, fabric flaps and fabric valves. The final result is that the diver can vary the volume of their buoyancy compensation chamber as required for a safe dive.

The side chambers 136 can be rolled to any point as indicated by the demands of the particular dive. Double sided velcro loop 150 connects with double sided hook 151. A piece of double sided velcro hook 152 attaches to the loop body of the buoyancy compensator. The cam buckle 101 of tank band 109 generates the pressure between the buoyancy compensator and the tank and secures the hook strap 152 from peeling off. In an emergency at the surface the reduced volume can be accessed by releasing the velcro valve straps 150 and 151. It is noted that the chamber behind the neck 134 is not accessible to being reduced.

SUMMARY, RAMIFICATIONS, AND SCOPE

Accordingly, the correct positioning of a very small amount of buoyancy can accomplish what five to ten times that same amount of buoyancy cannot, a single heads up righting moment that will protect the airway. After surviving the initial entry into the water, signaling search and rescue efforts can make the difference between life and death. Dual tragedy is the term applied to the death of the rescuer by a hypoxic victim, an inflatable float is one of the safest ways to approach a floundering victim. It can take hours for available life rafts to round up survivors, often victims who have survived the initial insult of entry perish within thirty minutes of hypothermia. The only solution to hypothermia is to remove the victim from the water whether they are waiting to be picked up by the life raft of it they are going to be spending an extended period at sea until land based search and rescue efforts arrive. The multi-function rescue product and raft comprised of a multiplicity of chambers, constructed from the appropriate material, can be built into the heads up safety vest where it is safely stored until needed.

The principles of a heads up safety vest need to be modified for use underwater by separating out high lift surface flotation, incorporating a variable volume buoyancy compensation chamber that can be reduced to the lowest volume necessary for a particular set of dive gear and dive environment. The current invention makes great strides in reducing the emergency ascent rate and thus reducing the exposure to pulmonary barotrauma, arterial gas embolism as well as the chances of developing decompression sickness. The buoyancy of some air cylinders when empty and the use of a primary back mounted buoyancy compensator, require the addition of a tank compensating keel weight to assure the diver that with or without the deployment of the forward chamber that once the diver is at the surface, that their only inflatable product will roll them over and place their airway out of the water if they are unable to do so themselves. A third self rupturing emergency buoyant ascent chamber can be an option if the diver insists on using an underwater propulsion device. The incorporation of numerous rescue devices as integrated chambers in fluid communication with the power inflated dedicated buoyancy compensator, allows the user rapid access to rescue boards, distress markers, transport rafts, dive site markers, underwater markers, salvage devices, tender crafts and surf mater. This wide range of power inflatable products confers significant advances in water safety, survival and enjoyment.

FIGS. 15 through 25 illustrate a first alternative embodiment for a counterweight assembly 300 which generally includes a weight member 302 and means for attaching weight member 302 to assure reliable and consistent heads up position of the person at surface level. A first means for attaching weight member 302 embodiment includes a pair of vertical slots 304 and 306 defined by weight member 302 and a tank band or strap 320 which includes a first end 322 and a second end 324. A tank band connection member can be provided at first end 322 of tank band 320. Preferably, the connection member is a tensioning device such as a conventional cam buckle 330, however, such is not limiting and other attachment mechanisms, such as D-rings, hook and loop fasteners, magnets, suction cup devices, etc., are considered within the scope of the invention.

To properly attach weight member 302 to air tank 301 second end 324 is inserted through vertical slots 304 and 306, weight member 302 is properly positioned with respect to air tank 301 and tank band 320 is tightly wrapped around air tank 301 with weight member 302 properly positioned. Cam buckle 330 provides for attachment of second end 324 with first end 322 to maintain weight member 302 in proper position along tank 301. Weight member 302 is preferably secured such that the diver or user cannot remove or release weight member 302 during his or her underwater travels. This guarantees reliable and consistent heads up positioning of the diver at the water surface level in the event the diver becomes incapacitated.

A non-skid means can be provided to prevent weight member 302 from moving out of position with respect to tank 301. Preferably, the non-skid means is a non-compressible rubber or plastic member 328 sewn to the inside surface of tank band 320, however, other conventional non-skid means can be provided and are considered within the scope of the invention.

Figure 26:
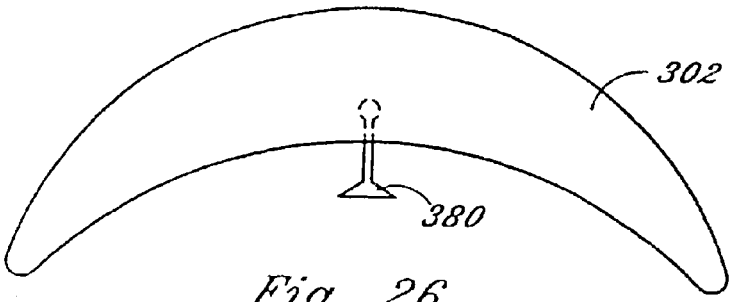
FIG. 26 is a top plan view of the counter weight member illustrated in FIG. 15 having at least one suction cup.
Figure 27:
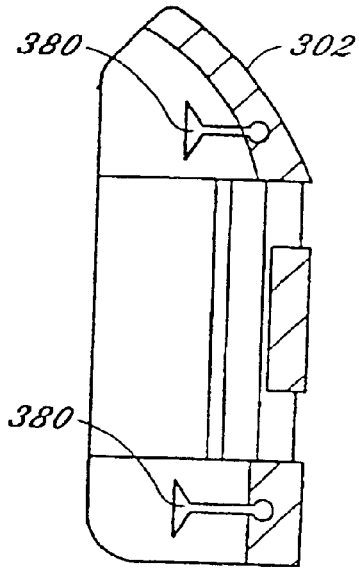
FIG. 27 is a side elevational view of the counter weight member illustrated in FIG. 15 having a plurality of suction cups.
Figure 25:
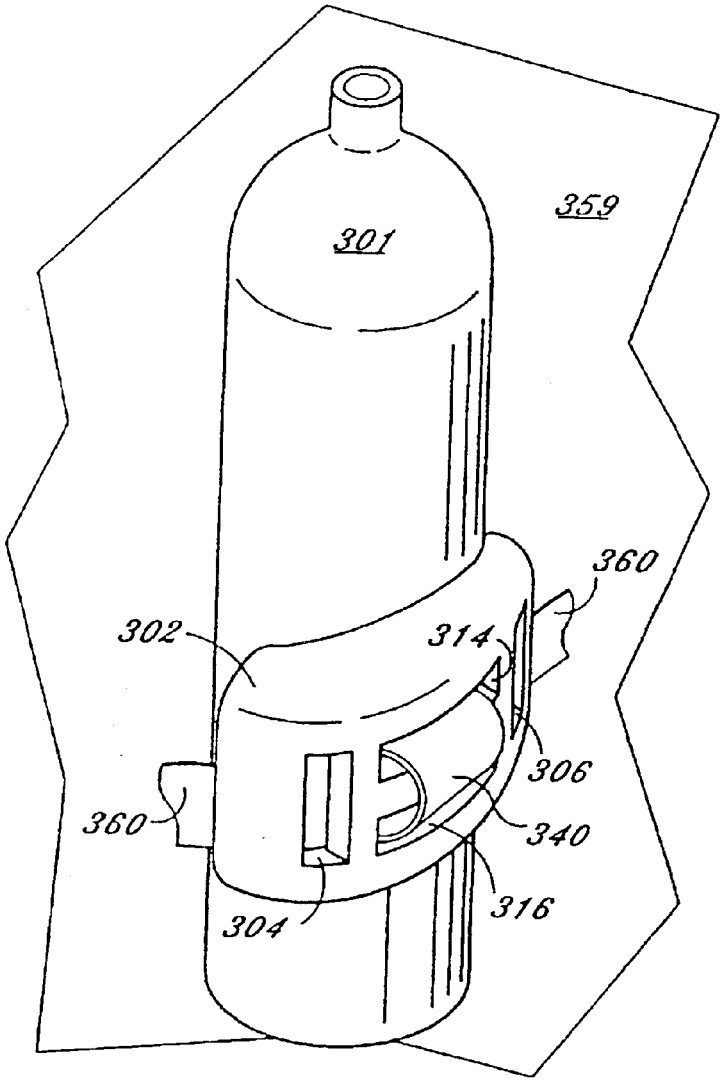
FIG. 25 is a front perspective view illustrating a second attachment embodiment for a first counterweight assembly in accordance with the present invention.

As seen in FIGS. 26 and 27, one or more suction cups 380 can be mechanically fastened into weight member 302 by conventional means. Alternatively, a sheet of suction cups (not shown) can be glued or molded into weight member 302. The sheet of suction cups is provided to cover a majority of the interior surface of counterweight 300. The sheet of suction cups is provided with apertures which are shaped and aligned with vertical slots 304 and 306 and horizontal slots 314 and 316, described in detail below, so not to interfere with the insertion of tank band 320 or coupling strap 340, also described in detail below, through slots 304 and 306 or 314 and 316, respectively.

In either suction cup embodiment, the suction cups are provided to provide a quick attachment of weight member 302, as well as a quick removal means for weight member 302. The suction cups are particularly useful during training or practices where the exact amount of ballast for the diver or person is uncertain and various weight members 302 of differing weights are to be attached and detached from cylinder 301 until the proper amount of ballast (weight) required for the specific individual is determined. Without the suction cups, the trainer or person determining the proper amount of ballast (weight), has to repeatedly attach and detach various weight members 302 via straps 320 or 340 as described above, which is very time consuming. The use of suction cups provide a quick and accurate method for readily determining a proper weight member 302 for the individual.

Additionally, the suction cups are also useful for maintaining weight member 302 in proper position, while weight member 302 is properly secured by either tank band 320 or coupling strap 340 in conjunction with strap 360 of buoyancy compensator 359.

Alternatively, a hook and loop/pin/snap system along the tank's longitudinal axis would allow rapid determination of size and location by a dive master/instructor. Thus, a multitude of known attachment devices could be incorporated and utilized by a second person assisting the user for determining the proper size and location of the weight member for the specific user.

An alternative means for attaching weight member 302 embodiment includes a pair of horizontal slots 314 and 316 and a relatively small coupling strap 340 for joining weight member 302 to a conventional buoyancy compensator strap 360 which is provided for conventionally attaching air cylinder 301 to a conventional buoyancy compensator 359.

Coupling strap 340 includes a first end 342, a second end 344, an outer surface 346 and an inner surface 348. Preferably, hook and loop fastening means 350 and 352 are provided on inner surface 348 at first end 342 and second end 344, respectively. However, other conventional attachment means, though not preferred, can also be utilized and are considered within the scope of the invention. Coupling strap 340 can also be provided with a pull strap 354 at first end 342.

To properly attach weight member 302, cylinder or tank 301 is initially conventionally loosely attached to buoyancy compensator 359 in conjunction with strap 360 which utilizes a conventional cam buckle for its connection means. Once cylinder 301 is loosely attached to buoyancy compensator 359, first end 342 of coupling strap 340 is inserted between strap 360 and cylinder 301. Second end 344 of coupling strap 340 is inserted through horizontal slot 314 or 316 from behind weight member 302 and then back through the other horizontal slot 316 or 314, respectively, for attachment to first end 342 by mating of hook and loop fastening means 350 and 352. Strap 360, having weight member 302 attached thereto, is tightened around cylinder 301 in conjunction with its cam buckle as is conventionally known, to securely attaching cylinder 301 to buoyancy compensator 359. It is to be understood that the roles of ends 342 and 344 can be reversed with second end 344 being inserted through and between strap 360 and cylinder 301 and first end 342 being inserted through horizontal slots 314 and 316 for mating with second end 344.

Prior to tightening strap 360, weight member 302 is properly positioned with respect to cylinder 301 and preferably, the mating of first end 342 to second end 344 is positioned between buoyancy compensator strap 360 and cylinder 301. This attachment position prevents inadvertent detachment of ends 342 and 344 from each other, once strap 360 is properly tightened, thus, assuring that weight member 302 will remain properly secured.

A slight recess 319 on the interior aspect of weight member 302 is preferably provided when attaching weight member 302 by a coupling strap 340. As the cam buckle generates tension in the buoyancy compensator strap 360, the tension also pulls on coupling strap 340. This pulling on coupling strap 340, tightens the attachment of weight member 302 to strap 360. The secured and tightened strap 360 compresses the hook and loop attachment of ends 342 and 344, thus, preventing accidental release. The point where ends 342 and 344 are positioned between strap 360 and cylinder 301 protrudes outward slightly which is received within recess 319 of weight member 302, when weight member 302 is properly secured. Thus, recess 319 helps couple weight member 302 specifically to the exact shape of each tank or cylinder 301 so that there is no opening to ensnare objects underwater.

When removing weight member 302, strap 360 is loosened by conventional means, and tab 354 is pulled to break the attachment of ends 342 and 344 to each other, which allows weight member 302 to be removed. However, it is important to note, that weight member 302 is preferably secured such that the diver or user cannot remove or release weight member 302 during his or her underwater travels. This guarantees reliable and consistent beads up positioning of the diver at the water surface level in the event the diver becomes incapacitated.

The threading of the cam buckle, in conjunction with strap 360, is a complicated process. Thus, by providing slots 314 and 316 and coupling strap 340, weight member 302 can be removed without having to re-thread the cam buckle.

Preferably, buoyancy compensator strap 360, similar to tank band 320, is provided with a non-skid means to prevent tank 301 from moving out of position with respect to its attachment by strap 360 and assuring that weight member 302 remains properly placed with respect to tank 301. Also like tank band 320, in the preferred embodiment, the non-skid means is a non-compressible rubber or plastic member 363 sewn to the inside surface of strap 360.

Preferably, the radius of weight member 302 is the same as the cylinder or tank 301 to which it is attached to prevent snagging of various underwater objects, such as fishing lines, when a diver, having a tank 301 and counterweight assembly 300 attached to his or her buoyancy compensator, is moving underwater. Accordingly, weight member 302 is preferably configured specifically to tank 301's circumference and is provided with a feathered edge (rounded/tapered leading edge) to eliminate any gaps which might snag kelp.

Though the various counterweight assembly described above and below are discussed in conjunction with a buoyancy compensator, it should be understood that the counterweight assemblies can also be utilized with personal flotation devices such as life jackets and life vests. Thus, where reference is made to a buoyancy compensator throughout the application, it is also intended to include other personal flotation devices such as the life jackets and life vests.

Weight member 302 can be provided with a soft coating to also prevent weight member 302 from sliding when properly attached, as well as increasing the adherence of weight member 302 and buoyancy compensator 359 to cylinder 301. The soft outer coating of weight member 302 also protects cylinder 301's protective and cosmetic coating from being scratched.

Weight member 302 is provided with a relatively thin flat profile which increases the total surface area between weight member 302 and cylinder 301 and increases the security of the attachment of buoyancy compensator 359 to cylinder 301. The lower profile is designed to provide less drag and less chance of snagging underwater objects such as kelp. Weight member 302 can be provided with a feathered edge to couple specifically to the exact shape of each tank or cylinder 301 so that there is no opening to ensnare objects underwater.

Preferably, weight member 302 can weigh approximately six (6 lbs) pounds. However, this weight amount is not limiting, and other weight amounts for weight member 302 can be utilized, as determined by a particular diver's needs, and are considered within the scope of the invention.

Figures 28, 29, 30, 31, 32, 33:
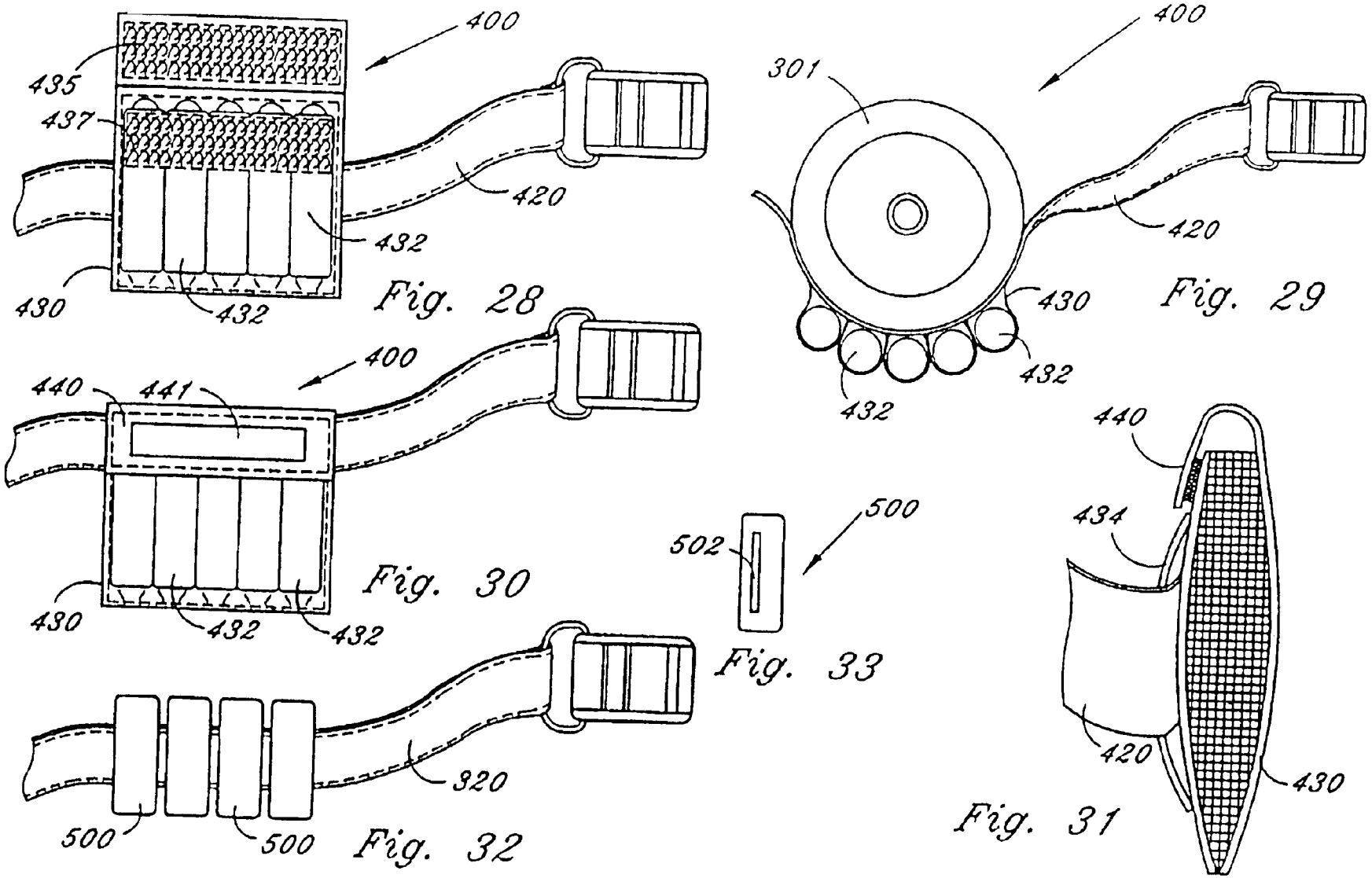
FIG. 28 is a front elevational view of a second embodiment counterweight assembly in accordance with the present invention in a flap open position.
FIG. 29 is a top elevational view of the second embodiment counterweight assembly with the flap removed.
FIG. 30 is a front elevational view of the second embodiment counterweight assembly in a flap closed position.
FIG. 31 is a side elevational view of the second embodiment counterweight assembly.
FIG. 32 is a front elevational view of a third embodiment counterweight assembly in accordance with the present invention.
FIG. 33 is a side elevational view of a weight member utilized with the third embodiment counterweight assembly.

FIGS. 28 through 30 illustrate a second alternative embodiment counterweight assembly generally designated as reference numeral 400. Counterweight assembly 400 can either be utilized with conventional buoyancy compensator strap 360 or can be utilized in conjunction with a tank strap or band 420, which is similar to tank band 320. Counterweight assembly 400 consists of a flexible pouch member 430 and one or more weight members 460. Pouch member 430 is preferably constructed from a fabric material, and can be either slidably and removably attached or permanently attached to either tank band 420 or buoyancy compensator strap 360.

When removably attaching pouch member 430 to either tank band 420 or strap 360, a loop member 434 is preferably attached to the back of pouch member 430, by conventional means such as stitching, and either tank band 420 or strap 360 is inserted through loop member 434 until pouch member is properly positioned with respect to cylinder 301. Where strap 360 is utilized, pouch member 430 is preferably properly positioned prior to final tightening of strap 360 around cylinder 301.

Alternatively, two loop portions (not shown) can be provided each being attached at their respective first ends to pouch member 430 by conventional means such as stitching. The second outer ends of the loop portions can respectively be provided with attachment means such as hook and loop fasteners. When removably attaching pouch member 430 to strap 360 or tank band 420, the outer ends of the loop portions being disposed between strap 360 or tank band 420 and cylinder 301, where the loop portion outer ends mate to define a loop member. Once the outer ends are mating and properly positioned, strap 360 or tank band 420 is properly tightened sandwiching the outer ends between cylinder 301 and strap 360 or tank band 420 to prevent inadvertent releasing of the outer ends, as well as assuring proper positioning of pouch member 430.

When permanent attachment of pouch member 430 is desired, such attachment is preferably accomplished by conventional means such as stitching or sewing (FIG. 29). Preferably, the permanent attachment of pouch member 430 to tank band 420 or strap 360 is such that pouch member 430 is properly positioned when tank band 420 or strap 360 is tightened.

Pouch member 430 can be provided with a plurality of individual weight receiving pockets 432. Preferably, four (4) to eight (8) individual pockets 432 are provided. However, this number of pockets 432 is not limiting, and other pocket 432 amounts can be provided and are considered within the scope of the invention. Alternatively, pouch member 430 can be provided with large weight receiving area.

Individual weights 460, which act as ballast members, can be inserted into one or more of pockets 432 or into the large weight receiving area, depending on the amount of weight required. Alternatively one large hard weight (i.e. lead, steel etc.) or soft weight (i.e. sand, loose ballast, etc.) can be provided in the large weight receiving area. Weight members 460 are preferably constructed from lead, though other materials can be utilized and are considered within the scope of the invention.

The use of one or more weight members 460 allows for fine tuning of the amount of weight necessary for reliable heads up positioning at water surface level of an incapacitated diver, taking into consideration the diver's weight, equipment, etc. Thus, the exact amount of weight or ballast can be provided to assure that the user's airway will be protected in the event of an emergency.

A flap member 440 can be attached to pouch member 430 by conventional means such as sewing or stitching. In use, flap member is folded over and attached to pouch member 430 preferably by conventional means such as by the mating of hook and loop fasteners 435 and 437 disposed on at least a portion of an inner surface of flap member 440 and on at least a back outer surface of pouch member 430. However, other attachment means can be provided such as snaps, buttons, zippers, etc., and are considered within the scope of the invention. Flap member 440 prevents weight members 460 from inadvertently being removed from their placement within pocket member 432 or the large weight receiving area. Thus, when counterweight assembly is properly positioned, flap member 440 is compressed, to guarantee it remains in its closed position, by tank strap 420 or strap 360. Hap member 440 can be provided with a non-skid member 441, similar to the non-skid members discussed above.

Additionally, in lieu of inserting weight members 460 across in a horizontal manner, pouch member 430 can be constructed such that the weight members are inserted within pouch member 430 in a vertical fashion. Preferably, each individual weight member 460 weighs approximately two (2 lbs) pounds, though such is not limiting and other weight amounts can be utilized and are considered within the scope of the invention. Furthermore, weight members 460 can be symmetrical, however, such is also not limiting.

Pouch member 430 can be constructed from neoprene, spandex, canvas, nylon, or other conventional soft and flexible fabric materials. Furthermore, elastic or other stretch means can be incorporated into pouch member, to assure a tight and snug fit of one or more weight members 460 within pouch member.

In this embodiment, pouch member 430 is preferably secured such that the diver or user cannot remove or release weight member(s) 460 during his or her underwater travels. This guarantees reliable and consistent heads up positioning of the diver at the water surface level in the event the diver becomes incapacitated. This feature of not allowing the diver or user from having access to the weight members dining his or her underwater travels is found in all of the tank mounted counterweight assemblies of the present invention, described above or below.

As seen in FIGS. 32 and 33, one or more individual weights 500 can be attached directly to conventional buoyancy compensator strap 360 or to tank band 320. In this counterweight assembly embodiment, weight members 500 are provided with a slot 502 for insertion therethrough of either strap 360 or tank band 320. Similar to above, a non-skid means (not shown) can also be provided on either strap 320 or 360 or weight members 500 to prevent weight members 500 from moving out of proper position. Also similar to above, the number of weight members 500 provided is dependent on several factors such as diver's weight, equipment weight, etc. Weight members 500 are preferably constructed from lead or steel, though other materials can be utilized and are considered within the scope of the invention. Weight members 500 preferably weigh between one (1 lb) pound to three (3 lbs) pounds each. However, this weight amount is not limiting, and other weight amounts for weight members 500 can be utilized and are considered within the scope of the invention.

Figures 34, 35, 36:
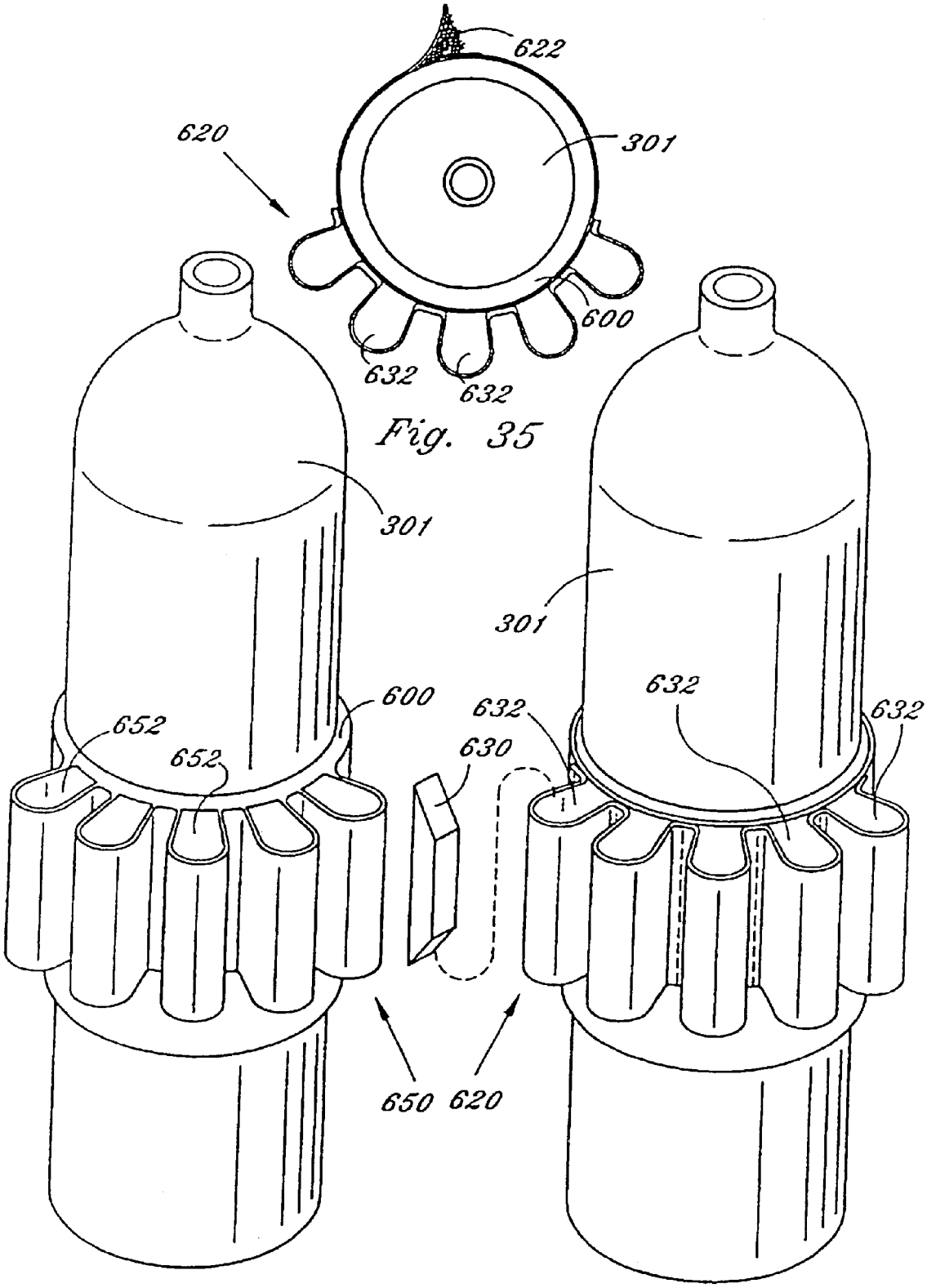
FIG. 34 is a perspective view of a fourth embodiment counterweight assembly in accordance with the present invention.
FIG. 35 is a top plan view of the fourth embodiment counterweight assembly.
FIG. 36 is a perspective view of a fourth embodiment counterweight assembly in accordance with the present invention.

As seen in FIGS. 34 through 36, a weighted sleeve member 600 can be positioned along tank or cylinder 301 to provide ballast in order to assure heads up positioning at water surface level of an incapacitated diver. Weighted sleeve member 600 is tightly slid along cylinder 301 to its proper position with respect to cylinder 301. Weighted sleeve member may be fastened by conventional means such as bolting.

A flexible pouch member 620, similar to the various embodiments pouch member of described above and below, can also be provided in addition to weighted sleeve member 600. Pouch member 620 can be provided with one or more weight 630 receiving pockets 632. Pouch member 620 is preferably constructed from a fabric material and can include a flap member (not shown). Pouch member 620 is preferably disposed around sleeve member 600 and can be attached by conventional means such as hook and loop fastening members 622 or by buckle means. Thus, weighted sleeve member 600 can have a non-user releasable connection securing an additional counterweight assembly to weighted sleeve member 600. Furthermore, weighted sleeve member 600 can be positioned at the bottom of tank 301 for use in warm water.

Alternatively, a pouch member 650 (FIG. 36), can be provided which is constructed from a rigid material, such as plastic and is preferably constructed integral with sleeve member 600. Pouch member 650 can be provided with one or more weight 630 receiving pockets 652. Rigid receiving pockets 652 can be provided with holes in their bottom to push weight members 630 out after the dive. As receiving pockets 652 are constructed from a rigid material, preferably, the weight members to be inserted within, should correspond in shape to pockets 652. Furthermore, conventional cap means is preferably provided for each pocket 652 to prevent the weight members from falling out during the dive. Pouch member 620 or 650 and sleeve member 600 function similar to the other embodiment pouch members of the present invention. The lateral edge of weight members 630 can be modified to allow it to easily slide into tracks (pockets 652) built into or formed integral with weighted sleeve member 600.

Figure 38A:
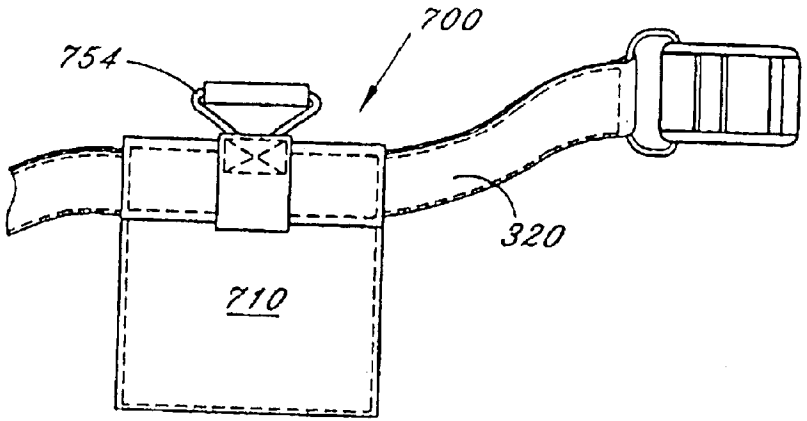
FIG. 38a is a front elevational view of the fifth embodiment counterweight assembly.
Figure 38B:
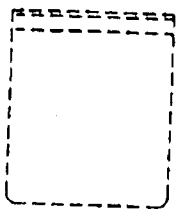
FIG. 38b is a front elevational view of a soft weight member in accordance with the present invention.
Figure 38C:
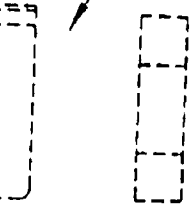
FIG. 38c is a front elevational view of a hard weight member in accordance with the present invention.
Figure 37:
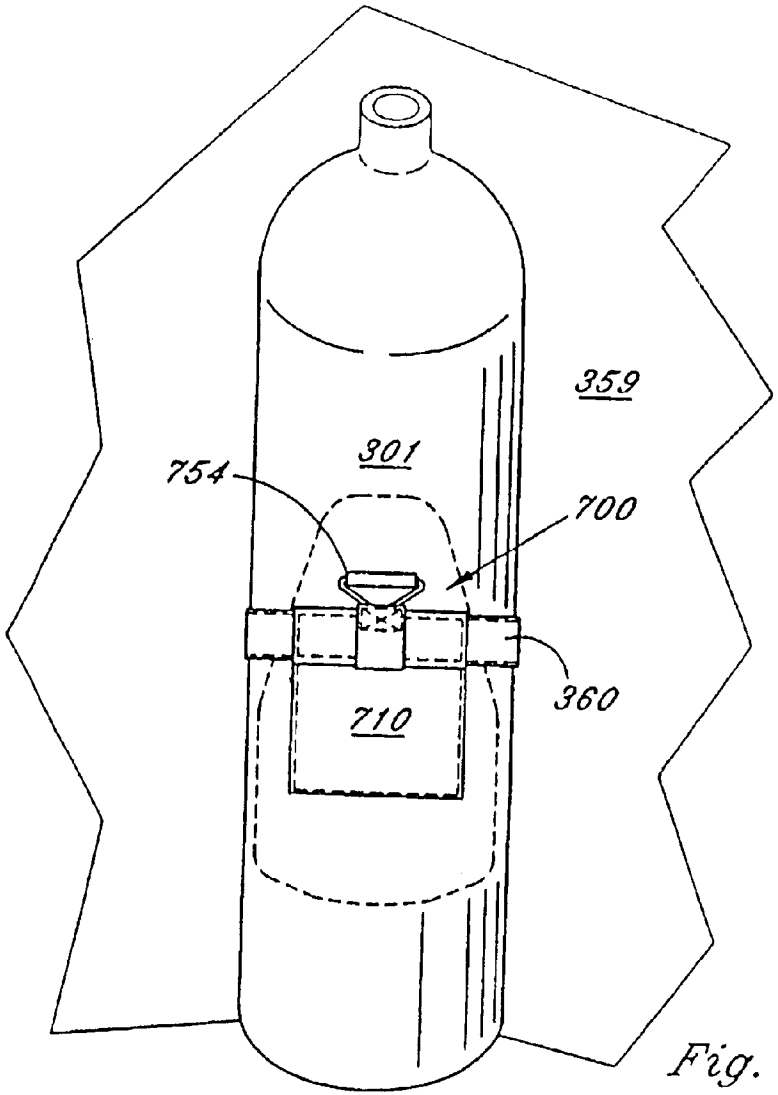
FIG. 37 is a perspective view of a fifth embodiment counterweight assembly in accordance with the present invention.
Figure 39A:
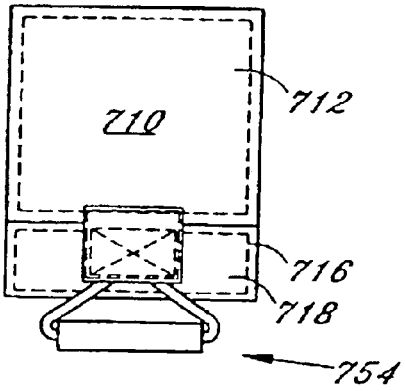
FIGS. 39a through 39e illustrate the various steps which are performed for removing a pouch member and associated weight member from a pocket member for the fifth embodiment counterweight assembly of FIG. 37.
Figure 39D:
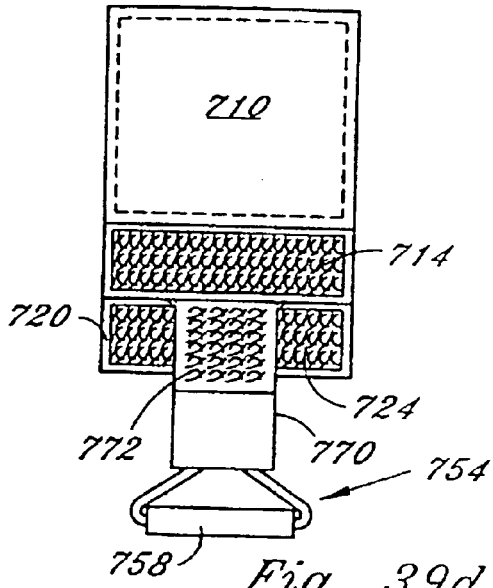
Figure 39B:
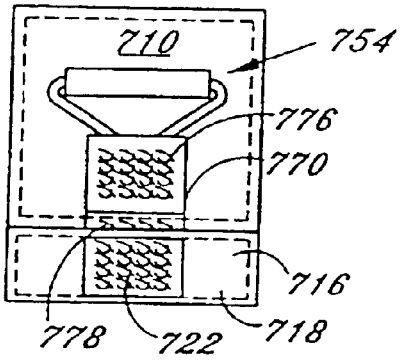
Figure 39C:
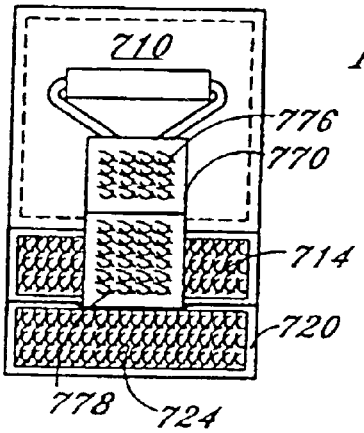
Figure 39E:
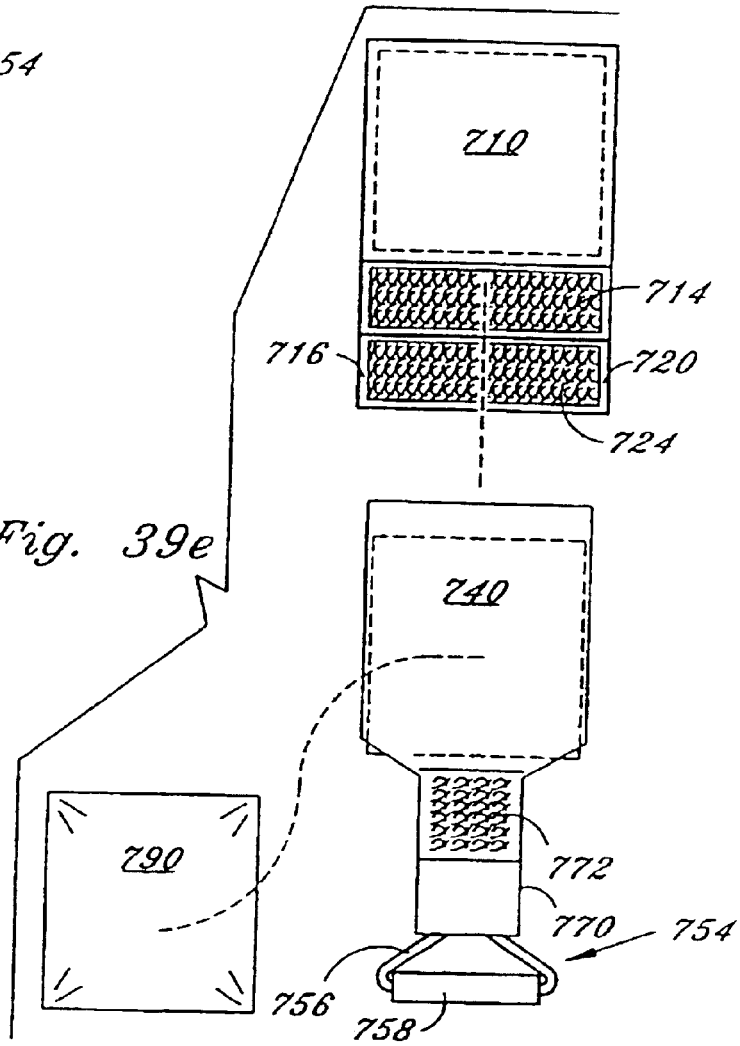

FIGS. 37 through 39 illustrate another counterweight assembly embodiment generally designated as reference numeral 700. Counterweight assembly 700 includes a pocket member 710 which can be either permanently or removably fixed to buoyancy compensator strap 360 or tank band 320, in any of the methods previously described above, and a hard weight member 780 or soft weight member 790 disposed within a pouch member 740 with pouch member 740 being at least partially disposed within pocket member 710.

Pouch member 740 is provided with a quick release handle 754 which is attached to pouch member 740 by a strap member 770 and allows a person, other than the user, to remove pouch member 740 and weight member 780 or 790 from pocket member 710 when a diver or other swimmer is finished with his or her underwater travels. Normally a person standing on a boat, dock or other type of surface, pulls off the diver's equipment (including his or her buoyancy compensator 359 and attached air tank 301) while the diver remains in the water.

This removal of equipment makes it easier for the diver to climb onto the boat or dock. Buoyancy compensator 359 and air tank 301 typically weigh together approximately fifty (50 lbs) pounds. With the use of certain buoyancy compensators currently available, an attached weight member 780 or 790 may add up to approximately eighteen (18) to twenty (20) additional pounds to the amount of weight the person in the boat has to remove. The person in the boat normally bends over towards the water in order to reach the diver who is in the water. This position, seriously exposes the person's back to strains and pulls, as well as potential hernias. Individuals who work on dive boats are constantly lifting the equipment onto the boat, in such awkward position, throughout the day. Accordingly, any reduction in the amount of weight to be lifted each time, becomes significant when such tasks are performed on numerous occasions during one outing or continuously throughout the day.

Thus, by providing a quick release means for weight members 780 or 790, the person in the boat can initially remove weight members 780 or 790, thus, reducing the weight of the buoyancy compensator and air tank to be lifted by approximately up to eighteen (18) to twenty (20) pounds. This reduction in weight could help to prevent many back problems commonly experienced by persons removing the diver's equipment onto the boat or dock.

FIG. 39 illustrates the various steps of removing quick release weight member 780 or 790 from pocket member 710 by the person on the boat or dock. As previously mentioned, it is to be understood that weight members 780 or 790, as well as all of the counterweight assembly embodiments of the present invention, are positioned such that the weight members cannot be removed or released by the diver in order to assure that the diver is consistently maintained in a heads up position in the event he or she becomes incapacitated.

Pocket member 710 is shown having an outer surface 712. A hook and loop fastening means 714 is provided on outer surface 712 adjacent an open end of pocket member 710. A pocket flap member 716 is provided having an outer surface 718 and an inner surface 720. A first flap hook and loop fastening means 722 is provided on outer surface 718 and a second hook and loop fastening means 724 is provided on inner surface 720. Pocket member 710 can be provided with a perforated portion.

Pouch member 740 houses removable weight member 780 or 790. The weight member can be a sandbag (soft weight 790), lead weight (hard weight 780), or other appropriate ballast member which can be disposed within pouch member 740. A hook and loop fastening means 772 is provided on a first surface of strap member 770 and hook and loop fastening means 776 and 778 are provided on a second surface of strap member 770. A first end of strap member 770 is attached to pouch member 740 and a second end of strap member 770 is attached to handle means 754 both by conventional means. Handle means 754 includes a triangularly shaped gripping member 756 having a gripping surface 758.

Weight members 780 or 790 act as ballast means to assure heads up positioning of an incapacitated diver at water surface level and in use are disposed within pouch member 740 which in turn is disposed within pocket member 710 with strap member 770 and handle means 454 protruding out of pocket member 710. A portion of hook and loop fastening means 724 mates with hook and loop fastening means 778, hook and loop fastening means 772 mates with a portion of hook and loop fastening means 714, and a remaining portion of hook and loop fastening means 724 mates with a remaining portion of hook and loop fastening means 714, by folding flap 716 inward along a fold line 717. At this point, strap 770 is folded inward over flap 716 to allow hook and loop fastening means 776 to mate with hook and loop fastening means 722 to securely retain weight member 780 or 790 within pocket member 710, to assure consistent heads up positioning of an incapacitated diver, while allowing a person standing on a boat or dock to remove weight member 780 or 790 when the diver is ready to climb onto the boat or dock.

To remove weight member 780 or 790, the person on the boat or dock grabs handle means 754 at gripping surface 758 and pulls handle means 754 with a normal, but strong, tugging motion force, which nearly simultaneously breaks the attachment of fastening means 776 to fastening means 722, fastening means 714 to fastening means 724, fastening means 772 to fastening means 714, and fastening means 778 to fastening means 724, to allow weight member 780 or 790 to be quickly removed from pocket member 710. Once removed, the person on the boat or dock, merely drops weight member 780 or 790 and pouch member 740, on the boat or dock, respectively, where it can be properly redisposed within pocket member 710, when the diver or another prepares to enter the water again.

Figure 41:
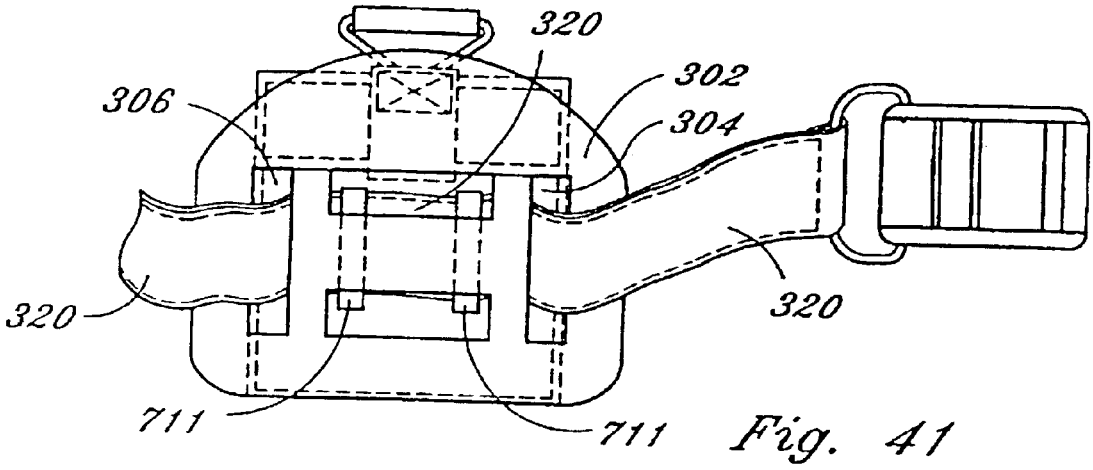
FIG. 41 is a back perspective view illustrating a combination of counterweight assemblies in accordance with the present invention utilized together.
Figure 40:
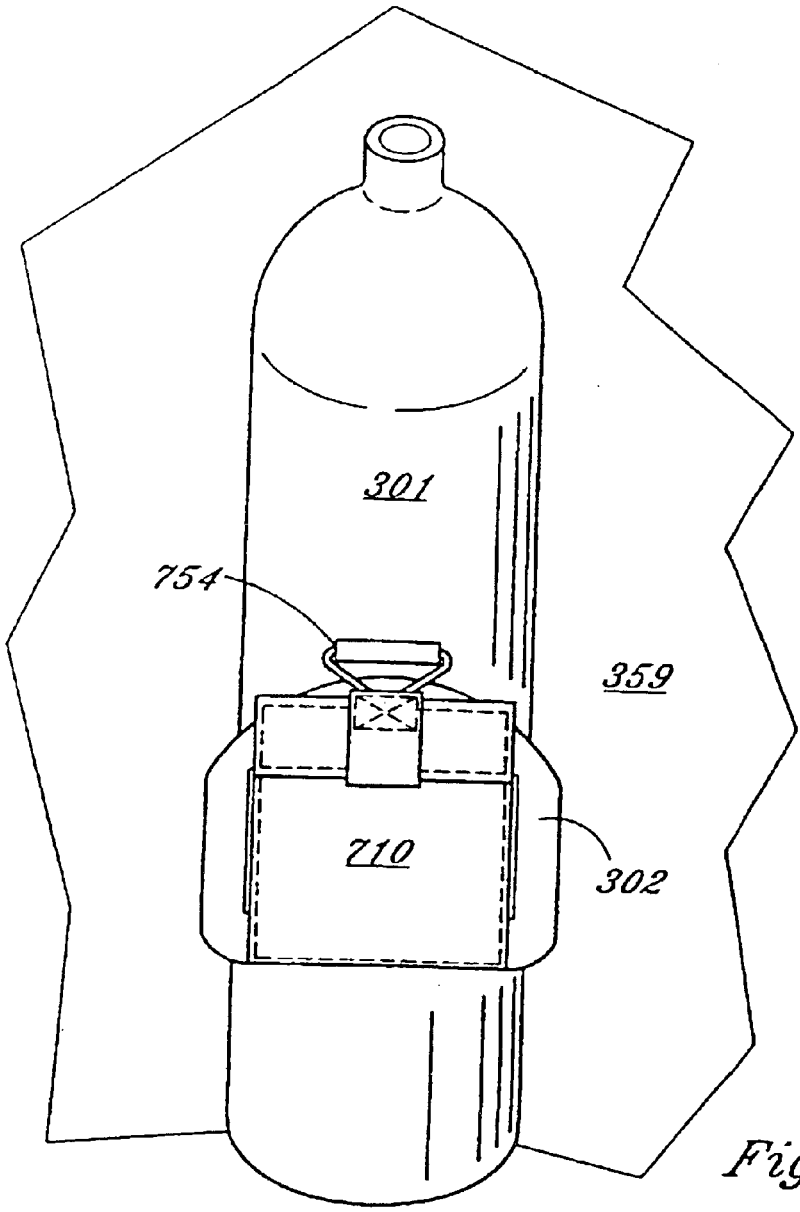
FIG. 40 is a front perspective view illustrating a combination of counterweight assemblies in accordance with the present invention utilized together.
Figure 42:
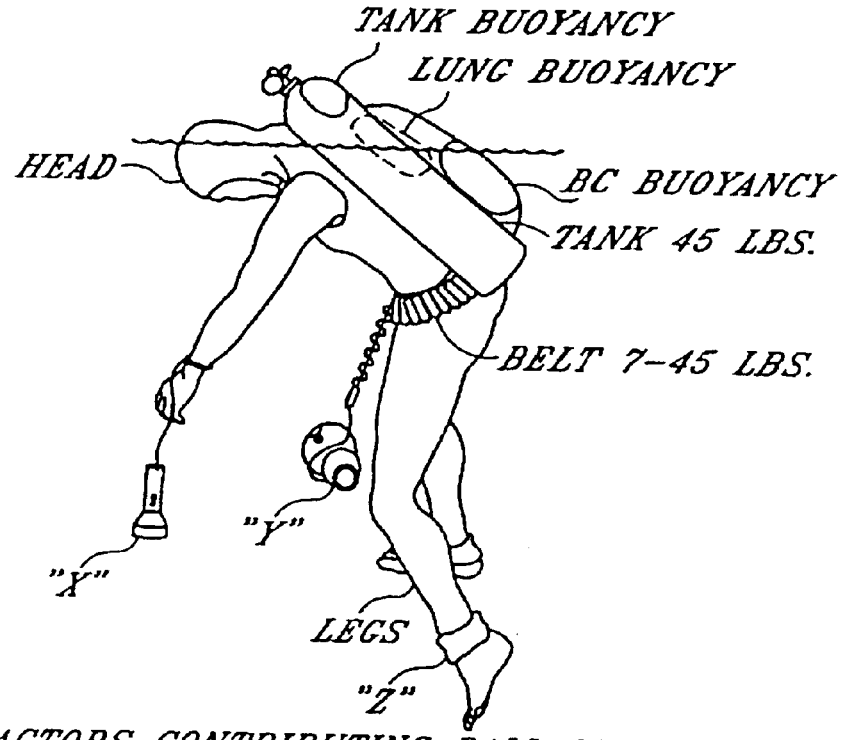
FIG. 42 is a perspective view of a diver having his or her airway submerged.
Figure 43:
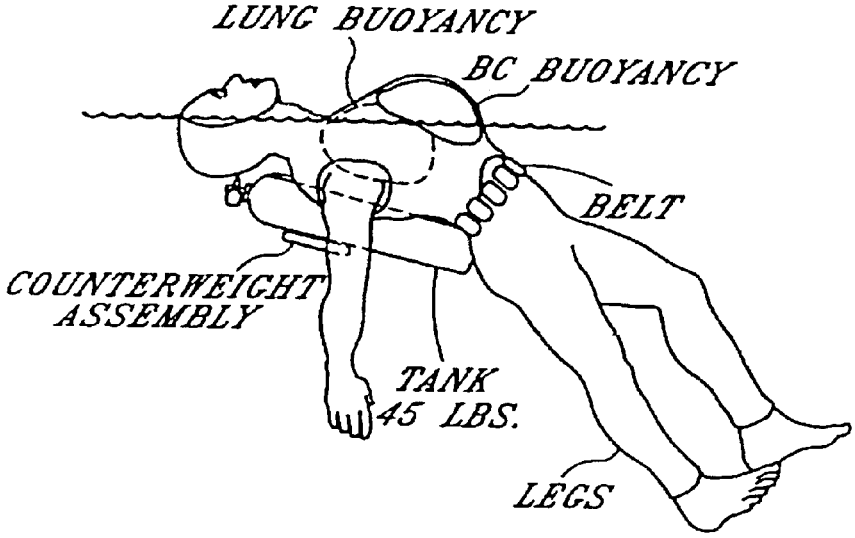
FIG. 43 is a perspective view of a diver having his or her airway protected in accordance with the present invention.

As seen in FIGS. 40 and 41, a combination of the previously described weight members can also be provided. As shown, counterweight assembly 300 is provided with a counterweight assembly 700 attached thereto. Weight member 302 provides a certain amount of ballast (weight), while the amount of ballast (weight member 780 or 790) provided within pocket member 710 varies depending on the weight of the diver and his or her equipment. Though, pocket member 710 is shown removably attached to weight member 302, it is to be understood, that the other pouch members described above, as well as one or more individual weights 500, can also be utilized in combination with weight member 302, and such other combinations are also within the scope of the invention. Furthermore, other combinations of counterweight assembly 700, counterweight assembly 300, individual weights 500 and the other pouch members described above can be provided and are all considered within the scope of the present invention.

To attach pocket member 710, or the other pouch members, tank band 320 is inserted through one of the vertical slots 304 or 306 of weight member 302, through a loop member attached to the back of pocket member (the loop portions described above could also be utilized), through the other vertical slot 306 or 304, respectively, and then tightened by conventional means, such as D-rings members, buckle means, etc, as described above.

Where weight member 302 is attached with buoyancy compensator strap 360, if loop portions are provided, the loop portions can be inserted through horizontal slots 314 and 316 and attached to each other, in lieu of providing coupling strap 340. Thus, in this embodiment, the loop portions provide the mechanism for attaching both weight member 302 to cylinder 301 and pocket member 710 to weight member 302.

It should also be understood in some applications, more than one of the same type of weight member, described above, may be utilized. For example, a first weight member 302 could be attached relatively high with respect to cylinder 301 and a second weight member 302 could be attached relatively low with respect to cylinder 301.

Furthermore, the vertical positioning of any of the weight members described above can be easily adjusted between dives or possibly by a person, other than the diver, during the dive. The weight member and tank band 320 are infinitely adjustable along the length of the horizontal axis. The ability to move tank band 320 and the attached weight member up and down the tank allows for optimal position of the weight member. This in turn allows the angle of the hyperextension of the "distressed" diver's neck at the surface to be accurately adjusted for optimal airway comfort. Thus, tank band 320 can be quickly and securely adjusted to attach the appropriate weight member in the appropriate position in response to any specific set of dive gear or dive environment.

A warm water diver may be diving with a minimal weight belt (i.e. four (4) to ten (10) pounds). Some divers may feel that attaching six (6) pounds of non-releasable ballast to their air cylinder 301 would result in a significant reduction in the amount of releasable ballast at depth. In order to incorporate the critical ballast counterweight (weight member) while preserving the diver's current releasable weight the diver can use an offsetting buoyant means, fixed or releasable. The diver that requires a four (4) pound counterweight (weight member) to provide reliable airway protection can add a four (4) pound buoyant pad to protect their tail bone from the tank, fill the space between the small of the back and their tank or use the buoyant material to pad the thorax or their head. The foam can be alternatively attached to the front of the buoyancy compensator where it can be released in the event of an uncontrolled emergency (i.e. ascent due to accidental loss of weight at depth as might occur if the weight belt is snagged). The foam on the front would also increase the strength of the face up righting moment at the surface as might be desired by the beginning diver.

It is notable that if the counterweight is large enough it will overcome all other righting moments. The larger the ballast the stronger the righting effect. The balance is that cylinder 301 is already heavy, at the point of barely manageable. The combination of the forward buoyant means and four (4) to eight (8) pounds of ballast in the counterweight keeps the total system light enough that it can be comfortably maneuvered. If the forward chamber is left at the surface to protect the diver from boat traffic then the counterweight must be approximately doubled to preserve the heads up safety feature. If the counterweight is large enough, it can act alone to right the diver. Its key requirement is that it be located exactly opposite the diver, easily adjusted to maintain that position. A securely attached counterweight can be used to retrofit existing buoyancy compensators, as long as they have an adherent element to assure that the counterweight will not slide from position.

The counterweight is critical in balancing out the entire set of dive gear so that in an emergency the diver's gear provides a single stabilized righting moment that places the distressed divers airway out of the water.

The counterweight embodiments described above (FIGS. 15 through 41) can be relatively easily incorporated into other products, such as any and all other life vests, life jackets, etc. Thus, the life jacket or other personal flotation device (collectively referred to as "life jacket") can be provided with a ballast/weight member attached to the back of the jacket, which as a counterweight member to provide angular momentum in rolling the diver or other wearer over in the water, such that the diver floats face up in the water. Preferably, the counterweight is attached posterior central.

A conventional life vest/life jacket can be comprised of inherently buoyant material, such as (1) kapok, closed foam; (2) mixed inherently buoyant material and inflatable ("hybrid" personal flotation device"); and (3) purely inflatable design. All of these design of a lifesaving buoyant means are improved by the addition of the ballast/counterweight. Preferably, the counterweight is able to be varied in size and position depending on the other equipment worn by the user and the user's anatomy. Typically the counterweight is between three (3) and six (6) pounds and is securely attachable to the life jacket adjacent and between the neck and lower back area of the user.

Furthermore, a conventional air tank or cylinder can have a weight member constructed integral with the tank if the intended wearer knows the specific amount of counterweight he or she requires, and the exact location of the weight member with respect to the air tank.

Additionally, where steel tanks or cylinders are utilized, a weight member having magnet means associated there with can be provided for directly attaching the weight member to the tank. This use would only be for training purposes and/or for determining the proper amount of weight, as well as the proper location of the weight on the tank, for the specific individual. This attachment embodiment would not be used during normal dives and underwater travels, as there is a chance that the weight member may move or inadvertently fall off. However, the weight member could also be provided with a strap, to provide a second attachment means for the weight member, as well as providing a secure attachment.

The counterweight allows for the application of ballast mediated airway protection to enhance surface airway management and promote self sufficiency. The reliable protection of a distressed diver's airway depends on the ballast not changing position in any of the three axis (up, down or around cylinder).

The instant invention achieves many critical features including providing that the weight be permanently attached, so that in an emergency it cannot be dropped. Since the weight member (counterweight) must be small enough to not compromise surface safety, it must be located on the back of the life jacket or on the back of the cylinder exactly opposite the diver where it generates the maximal rotational energy per pound of weight, rotational energy desperately needed to repeatedly turn the unconscious diver over onto their back against minor righting moments caused by limbs, variations in body density, and attached gear. In particular, if the victim is near heavy surf where the waves can flip a victim over onto their face, a strong heads up righting moment is essential. It should be understood that references to a "victim" include, but are not limited to, water accident victims and/or diving accident victims.

The counterweight assembly utilized is responsible for inflating the righting moment, and supplies the rotational energy needed to roll the victim over onto their back thereby assuring that the victim's face will be out of the water regardless of the angle of entry. Once the diver has reached the surface, the counterweight, in conjunction with the dynamics of a limp unconscious body, will oppose any tendency for the waves to roll the victim over into a face down position that would compromise the airway. In summary, the counterweight assembly provides lateral stabilization of the water accident victim or diver (victim), and opposes rotational motion of the waves from over turning the victim into a face down position, but in the event that occurs, the counterweight assembly will automatically flip the victim back over onto their back, reestablishing the heads up orientation.

When an air cylinder is attached to the life vest or buoyancy compensator, the tank compensating counterweight becomes critical. If the victim is lying face down at the surface and goes limp, the counterweight will roll the diver over onto their back, stabilizing the diver's airway out of the water. The size of the weight member selected is in proportion to the type and size of life vest or size of buoyancy compensator and cylinder and whether the water is fresh or salt The cylinder when empty is neutral to slightly negative, but lacks sufficient rotational energy to roll the victim over onto their back. The counterweight assembly in other words compensates for imbalances in the life vest, buoyancy compensator or the buoyancy shifts of the life vest or buoyancy compensator or the diver's air cylinder. If the cylinder remains negative when empty then the weight member can be smaller but still must generate sufficient angular momentum to offset the secondary righting moments generated by an imbalanced weight belt and attached gear or bladders. If the counterweight assembly is used as an adaption to existing vest style buoyancy compensator, then it has to be strong enough to overcome the side righting movements generated by the common practice of using buoyancy under the arms.

Central to the weight member's design is that it be made of a very dense material such as lead, and be located exactly opposite the diver on the back side of the life vest or the tank. Traditionally the buckle that generates pressure on the belt that attaches the buoyancy compensator to the tank is located in the center at the back of the tank. Because the posterior central position is so critical for the performance of the counterweight assembly, the buckle has to be moved off center. This shift in the cam buckles location results in a slight inconvenience in terms of reduced access but is necessary to preserve the critical location and therefore the righting moment of the compensating counterweight assembly.

Drowned divers are often found with their weight belts still on. Usually the weights are located along the waist and the amount runs from a couple of pounds to more than forty pounds. As the amount of weight increases, the weight member needs to be located higher up the air cylinder to offset the placement of the weight belt. A dual tank band (providing two weight members) allows for a wide variation of weight placement.

The weight member can also be incorporated into the metal of the cylinder, adhered to the cylinder, enclosed in a covering of any sort, or even attached with magnetism. A pouch or cylinder can be used to contain lead shot or beach sand as long as it is non-releasable and ideally located along the longitudinal axis of the cylinder and thereby serves to generate the heads up righting moment, with the least amount of weight. The various weight member embodiments, described above, guarantee a single surface position every time. That surface position being heads up.

The inclusion of a couple of pounds of weight integrated into the tank band of the buoyancy compensator will allow the diver to overcome numerous minor righting moments that can place the airway of the exhausted or distressed diver under the water leading to drowning, the major cause of death in the sport of diving.

The various counterweight embodiments provide for ballast mediated airway protection, namely, the protection of the diver's airway at water surface level, particularly in an emergency when the diver is unable to protect his or her airway. The various present invention counterweight assemblies reduce the current problem of airway submersion which normally leads to shallow water drowning, the number one cause of recreational diver fatalities.

The attachment of the buoyancy compensator to the tank has always created problems. A cam buckle is provided at the end of the strap to generate tension in the strap. The strap which attaches the tank to the buoyancy compensator, stretches when wet, which can cause the tank to slide down if not out. Thus, the critical ballast compensating counterweight (weight member), in addition to rolling the distressed diver over to protect his or her airway, through increasing the surface area for attachment, serves to markedly improve the attachment of the buoyancy compensator to the tank.

Thus, the present invention illustrates the use or attachment of a relatively small, non-releasable weight, which is applied to a variety of positions along the back of an air tank. The location at the back of the tank allows the size to be reduced to its minimum and still be able to provide reliable airway protection. In warm water the weight is provided relatively lower with respect to the air tank. In cold water where the diver has significant ballast already attached, the weight member is moved relatively higher with respect to the air cylinder towards the head to maintain optimal airway protection. The positioning of the weight member along the back of the tank, optimizes the angular momentum generated per unit of weight. The use of the smallest amount of weight possible to provide airway protection allows the warm water diver, who is by definition already using minimum weight.

With the use of a weight member as described above, from any position a distressed diver can be rolled over onto their back, repeatedly if necessary, with their neck hyperextended and their airway positioned free and clear. The distressed diver is provided with ballast mediated airway protection which allows only a single, stable, surface position. Thus, when the diver cannot protect their airway, they can count on their counterweight assembly to act as a self rescue device providing emergency heads up surface flotation. Self rescue requires that at all times throughout the entire dive or underwater travel that the diver's gear is balanced such that their airway will not suddenly become vulnerable to submersion solely because they have become a couple of pounds out of balance in the last minutes of the dive or underwater travel due to the loss of air.

The above described counterweight assemblies roll the diver over, out of his or her side high airway submerging position and onto his or her back when the diver is unconscious. Accordingly, from any position the diver is rolled over onto their back, neck hyper-extended as it drops back, opening the airway. A diver in balance has a single stable airway protective righting moment, while a diver out of balance is susceptible to airway submersion and shallow water drowning.

By it's variable position, high or low, the above-described counterweight assemblies also assists in balancing all of the buoyancy and ballast attached to the diver, creating improved airway support for the distressed diver, from the beginning through the end of their dive or underwater adventure. Diver airway protection is provided regardless of whether the diver's gear is attached or dropped in part or in whole, as may occur in an emergency. The counterweight assemblies are designed to compensate for loss ballast or shift in balance to extend airway protection throughout the dive or underwater travels. Even if the diver is originally face down and unconscious at the surface, the counterweight assembly, when properly positioned tends to almost immediately right the diver face up, thus, protecting the diver's airway should such diver lose consciousness on the surface.

Additionally, a variable displacement device can be provided for providing additional buoyancy to the diver and his or her gear to offset any excess ballast that must be attached to acquire airway protection through ballast mediated airway management as described above.

Some divers, in particular warm water tropical divers, may dive with very little ballast. On occasion, the diver requires a tank mounted ballast that exceeds the amount of ballast needed to submerge. Some reasons why this is required includes (1) diver anatomy (i.e. large "Barrel Chest"); (2) composition of the diver's cylinder (i.e. aluminum); (3) large displacement buoyancy compensator may require up to eighteen (18) to twenty (20) pounds of tank mounted counterweight to provided airway protection yet only require approximately seven (7) pounds to submerge while diving in a bathing suit in warm water; (4) diver wishes to retain the entire amount of releasable ballast so he or she can quickly acquire a net positive surface flotation by dropping his or her weight belt. In such situations the addition of buoyancy will allow the diver to retain his or her releasable weight belt while acquiring the ability to self rescue, as described above, i.e. protect his or her airway from submersion if the diver becomes unconscious. Preferably, the buoyancy added is non-compressible which can occur through the use of a rigid container built into the diver's buoyancy compensator back pack.

Thus, the buoyancy means is attached to the diver/gear to offset the required airway protective tank mounted ballast (weight member). Preferably, the buoyant means is a rigid, non-compressible means for the provision of a specific amount of buoyancy, such as a non-compressible foam with permanent flotation qualities or fixed buoyancy bladder with adjustment inner valve for custom sizing to diver's buoyancy needs. Other alternative embodiment include a closed cell foam. However, with the use of a closed cell foam, as the diver submerges the bubbles in the foam compress, thus, reducing the buoyancy and requiring air to be added to the diver's buoyancy compensator jacket. The added air needs to be vented on ascent.

The buoyancy means preferably has a variable volume to allow for volume adjustments specific to the diver/dive environment. Additionally a single or multiple buoyant means can be provided and arranged to enhance surface flotation altitude.

Figure 44:
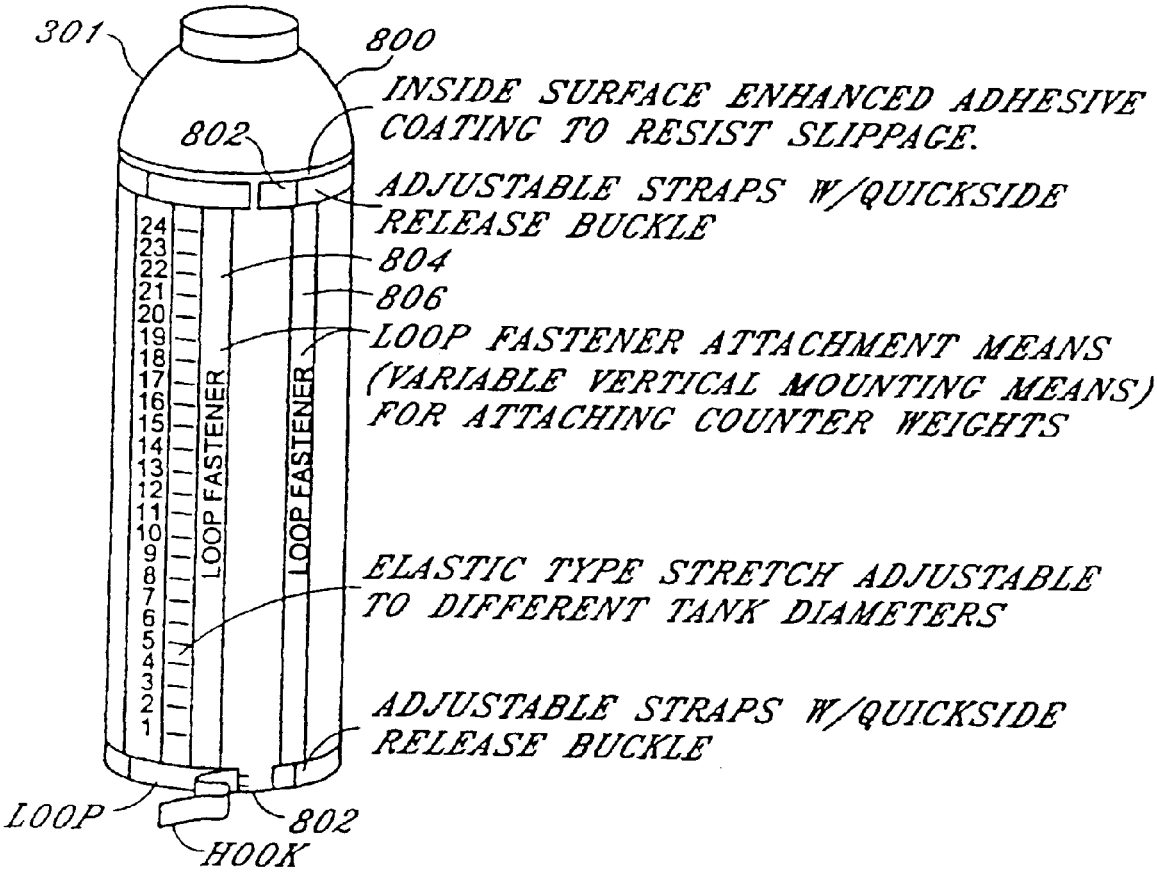
FIG. 44 is a perspective view of a training device for determining proper size and location for the weight member in accordance with the counterweight assemblies of the present invention
Figure 44:
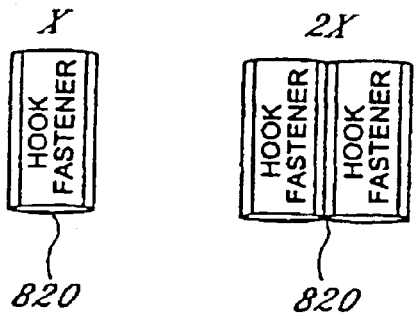

As seen in FIG. 44, a training device for a tank mounted counter weight member is shown and generally references as device 800. A dive instructor during training, such as pool training, needs to individualize the size and location of the tank mounted counter weight member for each student (diver). To facilitate this time consuming process a longitudinal attachment means 800 is affixed to tank 301 with a quick release coupling means, such as quick side release buckles 802, thus, allowing for rapid attachment and adjustment of size and position of weight member(s) 820 which are housed in sleeve members. Hook and loop fastening means is disposed on at least a portion of the outer surface of the sleeve members for mating with hook and loop fastening strips 804 and 806 associated with training device 800.

The very security that is demanded of the tank mounted counter weight member when used as a life saving means complicates its rapid change and adjustment. As a pool training aid, speed of adjustments is more important than security. As such, training device 800 can be preferably clearly marked with a warning label stating that the device in not to be used for diving.

The vertical tank mounted attachment means can be secured by a wide variety of mechanical means, including, magnetic, zippers, snaps, spring loaded pins, hook and loop fasteners, etc. For example, a fabric jacket having a strip of hook and loop fastening means attached along its length can be provided. Weights in specific sizes can be quickly affixed in combination to establish the correct size, then adjusted vertically to optimize the exact surface flotation position for hyperextension of the diver's neck. The weights are not limited to any specific, but preferably approximately one (1) or two (2) pounds each.

Training device 800 can be preferably provided with a vertical index 810 which identifies location, such as a measurement means from the bottom of tank 301. Thus, the instructor can inform the student of the exact location where the weight member should be attached to tank 301, as well as the exact amount of weight required at such location.

The fabric jacket can also be secured by a wide variety of means. Preferably, hook and loop fastening means is provided to allow the jacket to be easily attached to a wide variety of cylinder diameters. One or more adjustable locking belts can be provided for use with large tank mounted counter weights, which may be required with certain technical buoyancy compensators. The jacket may also be secured by a variety of other means such as belts, buckles, zippers, snaps, etc. Furthermore, the inside coating of the fabric is preferably of a high coefficient of friction to reduce any tendency of the jacket to slip or slide from proper position during adjustment and testing of various tank mounted counter weight member.

Figure 46:
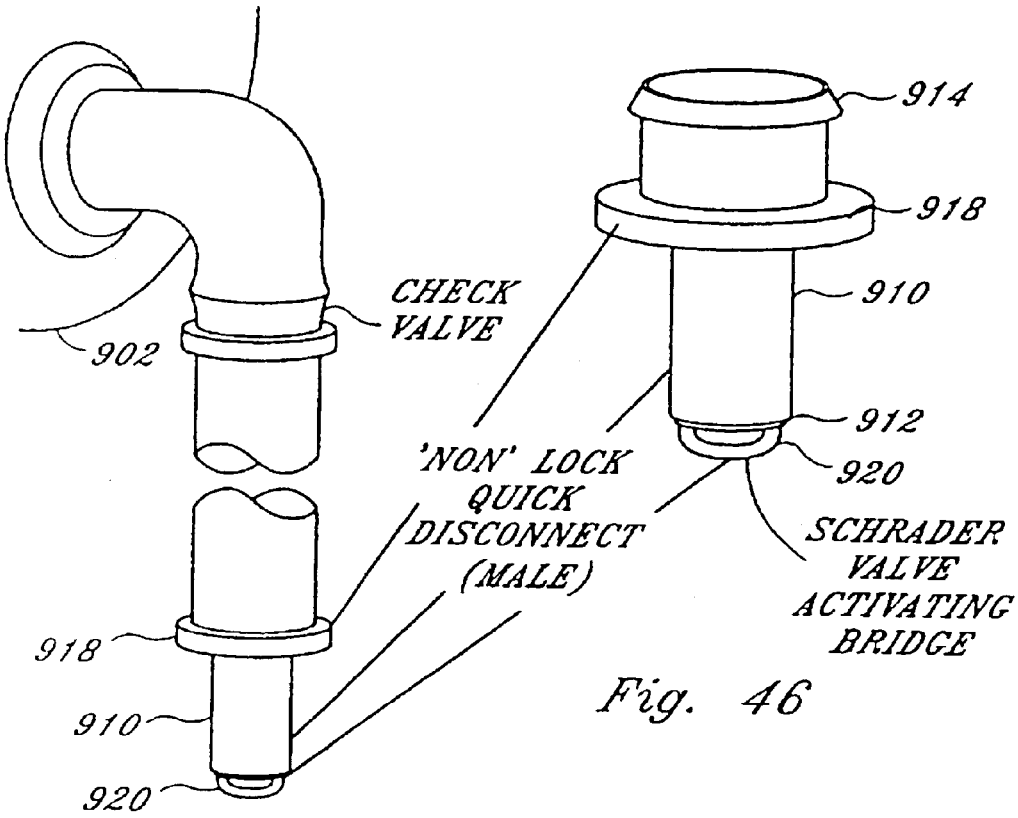
FIG. 46 is an enlarged perspective view of a male portion of the quick disconnect member illustrated in FIG. 45.
Figure 45:
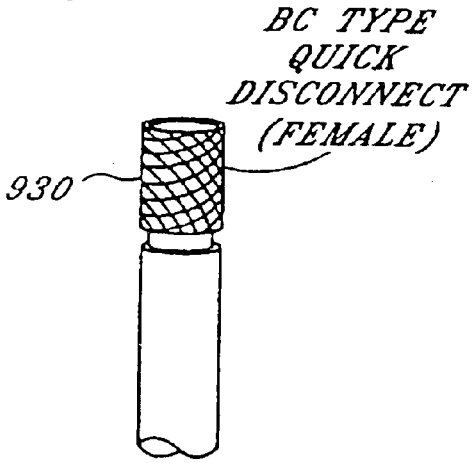
FIG. 45 is a perspective view of a quick disconnect member in accordance with the present invention.
Figure 47:
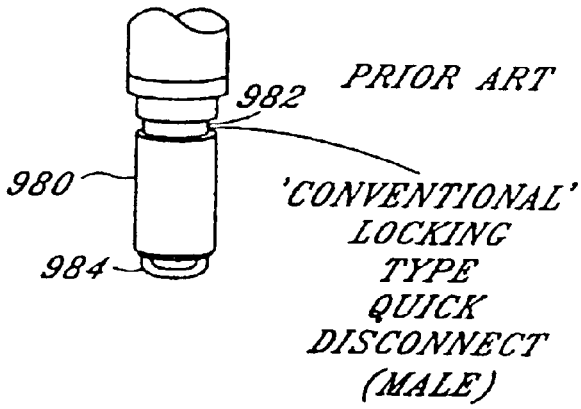
FIG. 47 is a perspective view of a prior art quick disconnect member having its female portion in section.
Figure 47:
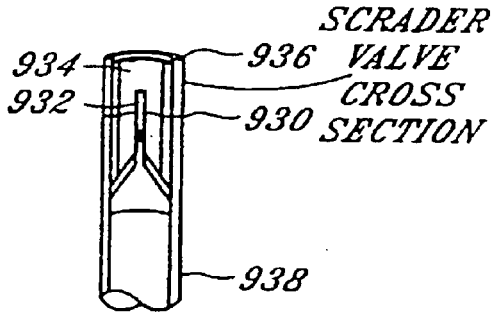

FIGS. 45 and 46 illustrate a quick disconnect connector embodiment generally designated as connector 900. Connector 900 generally includes a male member 910 associated with a lifting device 902 and a female member 930 commonly associated with an inflating hose member of a conventional buoyancy compensator (not shown). Typically, lifting device 902 is deployed at depth. Lifting device 902 can be any type of device which contains a flotation chamber, including, raft 96 shown in FIG. 10. When raft 96 is the intended lifting device, male member 910 replaces a conventional male member 192 (FIG. 10) and which is shown in greater detail as conventional male member 980 (FIG. 47).

With the use of a conventional connector (FIG. 47), male member 980 is provided with a groove member 982 for a locking attachment with female member 930, when the intended lifting device is to be inflated (i.e. emergency situation). Once male member 980 is property connected to female member 930, an activating member 984 presses a Schrader valve 932 disposed within an internal passageway 934 which extends through female member 930 from its first end 936 to its second end 938. The activation of Schrader valve 932 allows air to flow into the flotation chamber of the lifting device for inflation purposes.

However, with the connection of male member 980 to female member 930, the user (diver) is also attached to the lifting device. Under pressure it is often difficult to release male member 980 from its locking attachment to female member 930. Thus, as the lifting device begins to ascent, the diver (user) is placed in a position of uncontrolled ascent, possibly, leading the diver to one or more of the dangerous conditions described above.

As seen in FIGS. 45 and 46, male member 980 is replaced with a male member 910. Male member 910 includes a first end 912, a second end 914 and an internal passageway 916 extending through said male member 910 from first end 912 to second end 914. Male member is not provided with a groove member to avoid the locking problems described in the previous paragraph. Male member 910 can also be provided with an outer circular flange member 918 and a Schrader valve activating bridge member 920.

In use, male member 910 is received within internal passageway 934 of female member 930 until flange member 918 abuts an outer first end 936 of female member. Thus, flange member 918 acts as a stop means to properly position the first end of male member 910 within internal passageway 934 of female member 930. This positioning of male member 910 with respect to female member 930 allows bridge member 920 to activate Schrader valve 932 to allow air to flow within a flotation chamber of lifting device 940.

Male member 910 is slightly smaller in outer diameter as compared to the inner diameter of internal passageway 934. This allows male member 910 to be snugly and tightly received and maintained within internal passageway 934 of female member 930, while at the same quickly and easily releasable. Lastly, outer flange member 918 also serves as a gripping means to quickly remove male member 910 from within internal passageway 934 of female member 930 once the flotation chamber of lifting device 902 is properly inflated or in the event of an emergency.

The instant invention has been shown and described herein in what is considered to be the most practical and preferred embodiment. It is recognized, however, that departures may be made therefrom within the scope of the invention and that obvious modifications will occur to a person skilled in the art.

We claim:

1. A *combination* counterweight assembly *and cylinder* for providing enhanced heads up surface positioning of a person, said [counterweight assembly] *combination* comprising:

*a cylinder adapted to be attached to and worn by a person;* a weight member; and means for attaching said weight member to [a] *the* cylinder, [the cylinder adapted to be attached to the person,] said means for attaching and said weight member attached at a position on said cylinder where the person cannot remove said weight member while the cylinder is attached to the person;

*said weight member remains in a single fixed nonmovable position with respect to the cylinder while the cylinder is mounted to the person and in use by the person underwater;* wherein the attachment position of said weight member on the cylinder allows the weight member to rotate the person to ensure heads up *airway supportive* surface positioning if the person becomes incapacitated.

2. [The counterweight assembly of claim 1] *A combination counterweight assembly and cylinder for providing enhanced heads up surface positioning of a person, said combination comprising:*

*a cylinder adapted to be attached to and worn by a person;*

*a weight member; and*

*means for attaching said weight member to the cylinder, said means for attaching and said weight member attached at a position on said cylinder where the person cannot remove said weight member while the cylinder is attached to the person;*

*wherein the attachment position of said weight member on the cylinder allows the weight member to at least help rotate the person to ensure heads up airway supportive surface positioning if the person becomes incapacitated;* wherein said means for attaching is a flexible pocket member attached to a tank band, said tank band wrapped [and attached tightly] around the cylinder *and secured to the cylinder by a buckle mechanism*, wherein said weight member is disposed within said pocket member.

3. The counterweight assembly of claim 2 wherein said flexible pocket member is permanently attached to said tank band.

4. The counterweight assembly of claim 2 wherein said flexible pocket member is removably attached to said tank band.

5. The counterweight assembly of claim 2 wherein said flexible pocket member is divided into a plurality of weight receiving sections.

6. The counterweight assembly of claim 2 wherein said flexible pocket member has a flap member.

7. [The counterweight assembly of claim 6 further including] *A combination counterweight assembly and cylinder for providing enhanced heads up surface positioning of a person, said combination comprising:*

*a cylinder adapted to be attached to and worn by a person;*

*a weight member; and*

*means for attaching said weight member to the cylinder, said means for attaching and said weight member attached at a position on said cylinder where the person cannot remove said weight member while the cylinder is attached to the person;*

*wherein the attachment position of said weight member on the cylinder allows the weight member to at least help rotate the person to ensure heads up surface positioning if the person becomes incapacitated;*

*wherein said means for attaching is a flexible pocket member attached to a tank band, said tank band wrapped around the cylinder, wherein said weight member is disposed within said pocket member;*

*wherein said flexible pocket member has a flap member; and* a [releasable] pouch member *and a handle member*, said pouch member attached to [a] *the* handle member, said weight member disposed within said pouch member *and said pouch member is disposed within said flexible pocket member*, wherein *in use when said pouch member is disposed within said flexible pocket member* said handle member is disposed out of said pocket member [when properly assembled].

8. A *combination* counterweight assembly *and cylinder* for providing enhanced heads up surface positioning of a person, said [counterweight assembly] *combination* comprising:

*a cylinder adapted to be attached to and worn by a person;* a weight member; and means for attaching said weight member to [a] *the* cylinder, [the cylinder attached to the person,] said means for attaching and said weight member attached at a position on said cylinder where the person cannot remove said means for attaching and said weight member while the cylinder is attached to the person;

*said weight member remains in a single fixed nonmovable position with respect to the cylinder while the cylinder is mounted to the person and in use by the person underwater;* wherein the attachment position of said weight member on the cylinder allows said weight member to rotate the person to ensure heads up *airway supportive* surface positioning if the person becomes incapacitated;

*wherein said means for attaching including a tank band and a buckle mechanism with said buckle mechanism tightly securing said tank band around said cylinder.*

9. [The counterweight assembly of claim 8] *A combination counterweight assembly and cylinder for providing enhanced heads up surface positioning of a person, said combination comprising:*

*a cylinder adapted to be attached to and worn by a person;*

*a weight member; and*

*means for attaching said weight member to the cylinder, said means for attaching and said weight member attached at a position on said cylinder where the person cannot remove said means for attaching and said weight member while the cylinder is attached to the person;*

*wherein the attachment position of said weight member on the cylinder allows said weight member to at least help rotate the person to ensure heads up airway supportive surface positioning if the person becomes incapacitated;* wherein said means for attaching is a flexible pocket member attached to a tank band, said tank band wrapped [and attached tightly] around the cylinder *and secured to the cylinder by a buckle mechanism*, wherein said weight member is disposed within said pocket member.

10. The counterweight assembly of claim 9 wherein said flexible pocket member is divided into a plurality of weight receiving sections.

11. The counterweight assembly of claim 9 wherein said flexible pocket member has a flap member.

12. [The counterweight assembly of claim 11 further including] *A combination counterweight assembly and cylinder for providing enhanced heads up surface positioning of a person, said combination comprising:*

*a cylinder adapted to be attached to and worn by a person;*

*a weight member; and*

*means for attaching said weight member to the cylinder, said means for attaching and said weight member attached at a position on said cylinder where the person cannot remove said means for attaching and said weight member while the cylinder is attached to the person;*

*wherein the attachment position of said weight member on the cylinder allows said weight member to at least help rotate the person to ensure heads up surface positioning if the person becomes incapacitated;*

*wherein said means for attaching is a flexible pocket member attached to a tank band, said tank band wrapped around the cylinder, wherein said weight member is disposed within said pocket member*

*wherein said flexible pocket member has a flap member;* a [releasable] pouch member *and a handle member*, said pouch member attached to [a] *the* handle member, said weight member disposed within said pouch member *and said pouch member is disposed within said flexible pocket member*, wherein *in use when said pouch member is disposed within said flexible pocket member* said handle member is disposed out of said pocket member [when properly assembled].

* * * * *